(12) United States Patent
Karabinis

(10) Patent No.: US 7,113,778 B2
(45) Date of Patent: Sep. 26, 2006

(54) AGGREGATE RADIATED POWER CONTROL FOR MULTI-BAND/MULTI-MODE SATELLITE RADIOTELEPHONE COMMUNICATIONS SYSTEMS AND METHODS

(75) Inventor: Peter D. Karabinis, Cary, NC (US)

(73) Assignee: ATC Technologies, LLC, Reston, WA (US)

( * ) Notice: Subject to any disclaimer, the term of this patent is extended or adjusted under 35 U.S.C. 154(b) by 101 days.

(21) Appl. No.: 10/819,542

(22) Filed: Apr. 7, 2004

(65) Prior Publication Data

US 2004/0192293 A1    Sep. 30, 2004

Related U.S. Application Data

(63) Continuation-in-part of application No. 10/225,613, filed on Aug. 22, 2002, and a continuation-in-part of application No. 10/074,097, filed on Feb. 12, 2002, now Pat. No. 6,684,057.

(60) Provisional application No. 60/467,100, filed on May 1, 2003, provisional application No. 60/388,087, filed on Jun. 12, 2002, provisional application No. 60/383,690, filed on May 28, 2002, provisional application No. 60/322,240, filed on Sep. 14, 2001.

(51) Int. Cl.
*H04Q 7/20*    (2006.01)

(52) U.S. Cl. .......... 455/427; 455/522

(58) Field of Classification Search .......... 455/69, 455/522, 427, 12.1, 101
See application file for complete search history.

(56) References Cited

U.S. PATENT DOCUMENTS

| | | | |
|---|---|---|---|
| 5,073,900 A | | 12/1991 | Mallinckrodt |
| 5,303,286 A | | 4/1994 | Wiedeman |
| 5,339,330 A | | 8/1994 | Mallinckrodt |
| 5,394,561 A | * | 2/1995 | Freeburg .......... 455/428 |
| 5,446,756 A | | 8/1995 | Mallinckrodt |
| 5,511,233 A | | 4/1996 | Otten |
| 5,612,703 A | | 3/1997 | Mallinckrodt |
| 5,761,605 A | | 6/1998 | Tawil et al. |
| 5,812,968 A | * | 9/1998 | Hassan et al. .......... 704/221 |
| 5,832,379 A | | 11/1998 | Mallinckrodt |
| 5,835,857 A | | 11/1998 | Otten |

(Continued)

OTHER PUBLICATIONS

Report and Order and Notice of Proposed Rulemaking, FCC 03-15, *Flexibility for Delivery of Communications by Mobile Satellite Service Providers in the 2 GHz Band, the L-Band, and the 1.6/2.4 Bands*, IB Docket No. 01-185, Adopted: Jan. 29, 2003, Released: Feb. 10, 2003.

International Search Report, PCT/US02/26847, Apr. 3, 2003.

*Primary Examiner*—Nay Maung
*Assistant Examiner*—Tu X. Nguyen
(74) *Attorney, Agent, or Firm*—Myers Bigel Sibley & Sajovec

(57) ABSTRACT

A satellite radiotelephone system includes a space-based component that is configured to communicate with multiple radiotelephones over multiple frequency bands and/or multiple air interfaces. An ancillary terrestrial network is configured to communicate terrestrially with the multiple radiotelephones over substantially the multiple frequency bands and/or substantially the multiple air interfaces. An aggregate radiated power controller is configured to limit an aggregate radiated power by the multiple radiotelephones to a maximum aggregate radiated power.

120 Claims, 16 Drawing Sheets

U.S. PATENT DOCUMENTS

| | | |
|---|---|---|
| 5,878,329 A | 3/1999 | Mallinckrodt |
| 5,937,332 A | 8/1999 | Karabinis |
| 5,940,753 A | 8/1999 | Mallinckrodt |
| 5,995,832 A | 11/1999 | Mallinckrodt |
| 6,052,560 A | 4/2000 | Karabinis |
| 6,097,752 A * | 8/2000 | Wiedeman et al. ......... 375/130 |
| 6,108,561 A | 8/2000 | Mallinckrodt |
| 6,169,878 B1 | 1/2001 | Tawil et al. |
| 6,449,461 B1 | 9/2002 | Otten |
| 6,522,865 B1 | 2/2003 | Otten |
| 2002/0058478 A1 * | 5/2002 | de La Chapelle et al. . 455/13.4 |
| 2002/0193146 A1 * | 12/2002 | Wallace et al. ............. 455/562 |
| 2003/0022625 A1 | 1/2003 | Otten et al. |
| 2003/0149986 A1 | 8/2003 | Mayfield et al. |

* cited by examiner

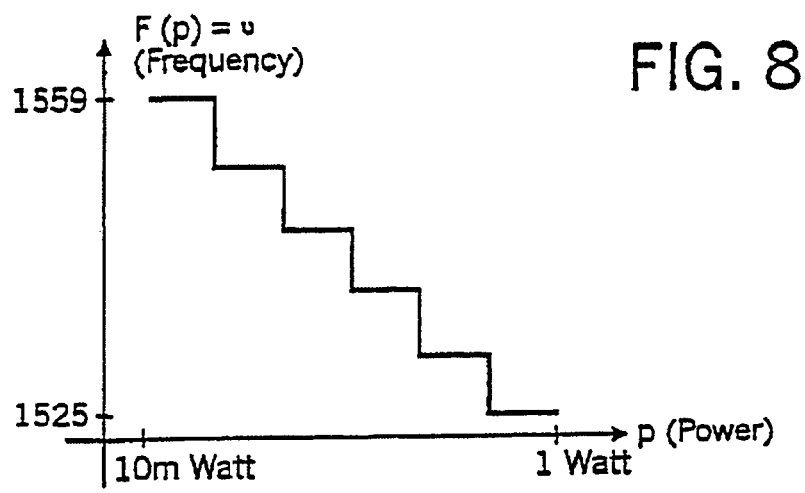
FIG. 8
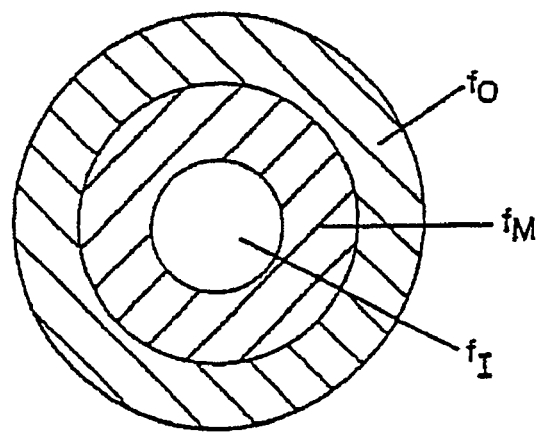
FIG. 9
FIG. 10
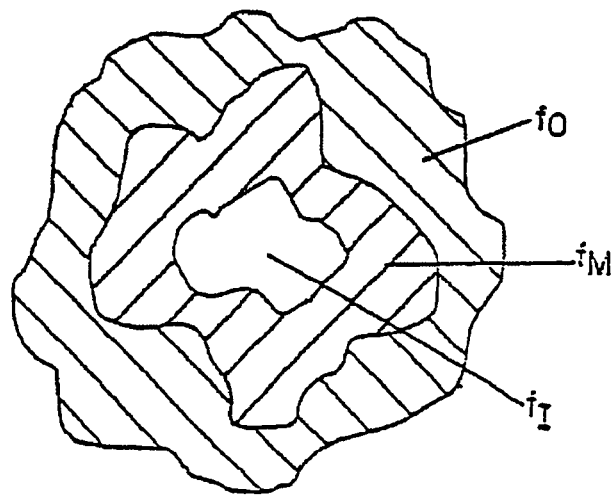

AGGREGATE RADIATED POWER CONTROL FOR MULTI-BAND/MULTI-MODE SATELLITE RADIOTELEPHONE COMMUNICATIONS SYSTEMS AND METHODS

CROSS-REFERENCE TO RELATED APPLICATIONS

This application claims the benefit of provisional Application No. 60/467,100, filed May 1, 2003, entitled Aggregate Radiated Power Control for Multi-Band/Multi-Mode Satellite Radiotelephone Communications Systems and Methods, and is a continuation-in-part (CIP) of application Ser. No. 10/225,613, filed Aug. 22, 2002, entitled Multi-Band/Multi-Mode Satellite Radiotelephone Communications System and Methods, which itself claims the benefit of provisional Application No. 60/322,240, filed Sep. 14, 2001, entitled Systems and Methods for Terrestrial Re-Use of Mobile Satellite Spectrum; provisional Application Serial No. 60/383,690, filed May 28, 2002, entitled Multi-Band/Multi-Mode Satellite Radiotelephone Communications Systems and Methods; provisional Application Serial No. 60/388,087, filed Jun. 12, 2002, entitled Multi-Band/Multi-Mode Satellite Radiotelephone Communications Systems and Methods; and is a continuation-in-part (CIP) of application Ser. No. 10/074,097, filed Feb. 12, 2002 now U.S. Pat. No. 6,684,057, entitled Systems and Methods for Terrestrial Reuse of Cellular Satellite Frequency Spectrum, all of which are assigned to the assignee of the present application, the disclosures of all of which are hereby incorporated herein by reference in their entirety as if set forth fully herein.

FIELD OF THE INVENTION

This invention relates to radiotelephone communications systems and methods, and more particularly to terrestrial cellular and satellite cellular radiotelephone communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites that are configured to wirelessly communicate with a plurality of satellite radiotelephones.

A satellite radiotelephone communications system or method may utilize a single antenna beam covering an entire area served by the system. Alternatively, in cellular satellite radiotelephone communications systems and methods, multiple beams are provided, each of which can serve distinct geographical areas in the overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communication signals being communicated from the satellite to the radiotelephone over a downlink or forward link, and from the radiotelephone to the satellite over an uplink or return link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver. A radiotelephone also may be referred to herein as a radioterminal.

Terrestrial networks can enhance cellular satellite radiotelephone system availability, efficiency and/or economic viability by terrestrially reusing at least some of the frequency bands that are allocated to cellular satellite radiotelephone systems. In particular, it is known that it may be difficult for cellular satellite radiotelephone systems to reliably serve densely populated areas, because the satellite signal may be blocked by high-rise structures and/or may not penetrate into buildings. As a result, the satellite spectrum may be underutilized or unutilized in such areas. The terrestrial reuse of at least some of a satellite band's frequencies can reduce or eliminate this potential problem.

Moreover, the capacity of the overall system can be increased significantly by the introduction of terrestrial reuse of a satellite band's frequencies, since terrestrial frequency reuse can be much denser than that of a satellite-only system. In fact, capacity can be enhanced where it may be mostly needed, i.e., densely populated urban/industrial/commercial areas. As a result, the overall system can become much more economically viable, as it may be able to serve a much larger subscriber base.

One example of terrestrial reuse of satellite frequencies is described in U.S. Pat. No. 5,937,332 to the present inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink signal received from a satellite thereby increasing the effective downlink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Finally, satellite radiotelephones for a satellite radiotelephone system or method having a terrestrial component within the same satellite frequency band and using substantially the same air interface for both terrestrial and satellite communications can be cost effective and/or aesthetically appealing. Conventional dual band/dual mode alternatives, such as the well known Thuraya, Iridium and/or Globalstar dual mode satellite/terrestrial radiotelephone systems, may duplicate some components, which may lead to increased cost, size and/or weight of the radiotelephone. See U.S. Pat. No. 6,052,560 to the present inventor Karabinis, entitled Satellite System Utilizing a Plurality of Air Interface Standards and Method Employing Same.

In view of the above discussion, there continues to be a need for systems and methods for terrestrial reuse of cellular satellite frequencies that can allow improved reliability, capacity, cost effectiveness and/or aesthetic appeal for cellular satellite radiotelephone systems, methods and/or satellite radiotelephones.

SUMMARY OF THE INVENTION

Some embodiments of the present invention provide satellite radiotelephone systems and communications methods wherein a space-based component is configured to communicate with radiotelephones in a satellite footprint that is divided into a plurality of satellite cells. The space-based component is configured to communicate with a first radiotelephone in a first satellite cell over a first frequency band and/or a first air interface, and to communicate with a second radiotelephone in a second satellite cell over a second frequency band and/or a second air interface. In some embodiments, an ancillary terrestrial network also is provided that is configured to communicate terrestrially with the first radiotelephone over substantially the first frequency band and/or substantially the first air interface, and to communicate terrestrially with the second radiotelephone over substantially the second frequency band and/or substantially the second air interface.

In other embodiments, satellite radiotelephone systems and methods comprise a space-based component that is configured to communicate with a first radiotelephone over a first frequency band and/or a first air interface, and with a second radiotelephone over a second frequency band and/or a second air interface. An ancillary terrestrial network is configured to communicate terrestrially with the first radiotelephone over substantially the first frequency band and/or substantially the first air interface, and to communicate terrestrially with the second radiotelephone over substantially the second frequency band and/or substantially the second air interface. The first and second radiotelephones may be in the same satellite cell or in different satellite cells.

In any of the above embodiments, the ancillary terrestrial network can comprise a first ancillary terrestrial component that is configured to communicate terrestrially with the first radiotelephone over substantially the first frequency band and/or substantially the first air interface, and a second ancillary terrestrial component that is configured to communicate terrestrially with the second and/or first radiotelephone over substantially the second frequency band and/or substantially the second air interface. In some embodiments, the first ancillary terrestrial component is in the first satellite cell, and the second ancillary terrestrial component is in the second satellite cell. In other embodiments, they are in the same satellite cell. In yet other embodiments, the first ancillary terrestrial component is operated by a first wireless network operator and the second ancillary terrestrial component is operated by a second wireless network operator.

Moreover, in any of the above-described embodiments, the ancillary terrestrial network can comprise a first portion that is configured to communicate terrestrially with the first radiotelephone over substantially the first frequency band and/or substantially the first air interface, and a second portion that is configured to communicate terrestrially with the second and/or first radiotelephone over substantially the second frequency band and/or substantially the second air interface. In some embodiments, the first portion is operated by a first wireless network operator and the second portion is operated by a second wireless network operator.

In any of the above embodiments, a gateway also may be provided that is configured to communicate with the space-based component over a feeder link. The feeder link is configured to transport communications between the space-based component and the first and second radiotelephones. In some embodiments, the feeder link comprises the first air interface and the second air interface.

Still other embodiments of the present invention control the aggregate radiated power by the radiotelephones in multi-band/multi-mode satellite radiotelephone communications systems and methods. Specifically, some embodiments of the present invention provide satellite radiotelephone systems wherein a space-based component is configured to communicate with a plurality of radiotelephones over a plurality of frequency bands and/or a plurality of air interfaces. An ancillary terrestrial network is configured to communicate terrestrially with the plurality of radiotelephones over substantially the plurality of first frequency bands and/or substantially the plurality of air interfaces. An aggregate radiated power controller is configured to limit an aggregate radiated power by the plurality of radiotelephones to a maximum aggregate radiated power. Analogous aggregate radiated power controlling methods also may be provided.

Accordingly, some embodiments of the present invention allow space-based communications to be added to a first terrestrial network that is configured to communicate with a first radiotelephone over a first frequency band and/or a first air interface, and to a second terrestrial network that is configured to communicate with a second radiotelephone over a second frequency band and/or a second air interface. These embodiments provide communications between a space-based component and the first radiotelephone over substantially the first frequency band and/or the first air interface and between the space-based component and the second radiotelephone over substantially the second frequency band and/or substantially the second air interface. It will be understood that embodiments of the present invention may be provided as systems and/or methods.

BRIEF DESCRIPTION OF THE DRAWINGS

FIG. 8 graphically illustrates mapping of monotonically decreasing power levels to frequencies according to embodiments of the present invention.

FIG. 9 illustrates an ideal cell that is mapped to three power regions and three associated carrier frequencies according to embodiments of the invention.

FIG. 10 depicts a realistic cell that is mapped to three power regions and three associated carrier frequencies according to embodiments of the invention.

DETAILED DESCRIPTION OF PREFERRED EMBODIMENTS

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
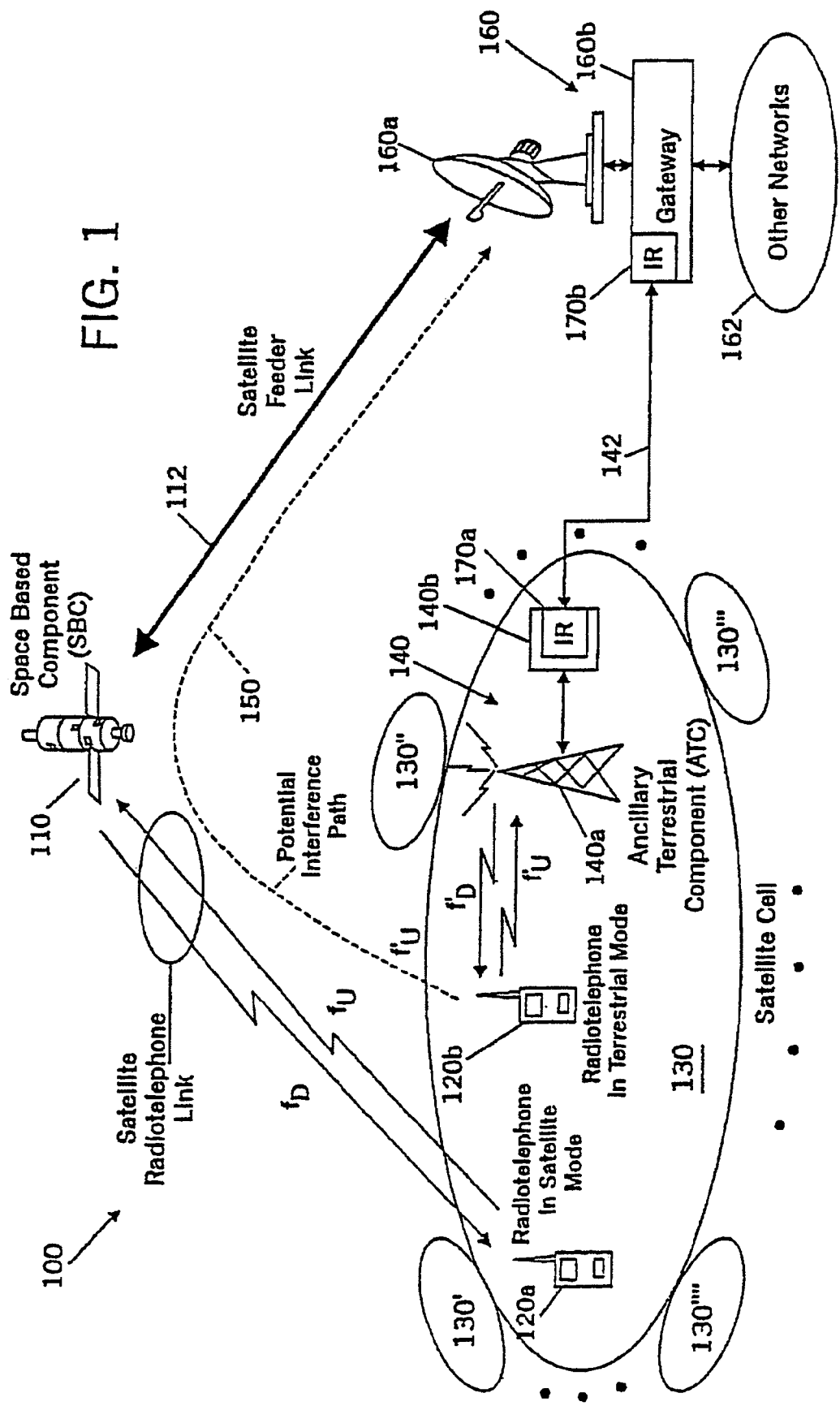
FIG. 1 is a schematic diagram of cellular radiotelephone systems and methods according to embodiments of the invention.

FIG. 1 is a schematic diagram of cellular satellite radiotelephone systems and methods according to embodiments of the invention. As shown in FIG. 1, these cellular satellite radiotelephone systems and methods 100 include at least one Space-Based Component (SBC) 110, such as a satellite. The space-based component 110 is configured to transmit wireless communications to a plurality of radiotelephones 120a, 120b in a satellite footprint comprising one or more satellite radiotelephone cells 130–130'''' over one or more satellite radiotelephone forward link (downlink) frequencies $f_D$. The space-based component 110 is configured to receive wireless communications from, for example, a first radiotelephone 120a in the satellite radiotelephone cell 130 over a satellite radiotelephone return link (uplink) frequency $f_U$. An ancillary terrestrial network, comprising at least one ancillary terrestrial component 140, which may include an antenna 140a and an electronics system 140b (for example, at least one antenna 140a and at least one electronics system 140b), is configured to receive wireless communications from, for example, a second radiotelephone 120b in the radiotelephone cell 130 over the satellite radiotelephone uplink frequency, denoted $f'_U$, which may be the same as $f_U$. Thus, as illustrated in FIG. 1, radiotelephone 120a may be communicating with the space-based component 110 while radiotelephone 120b may be communicating with the ancillary terrestrial component 140. As shown in FIG. 1, the space-based component 110 also undesirably receives the wireless communications from the second radiotelephone 120b in the satellite radiotelephone cell 130 over the satellite radiotelephone frequency $f'_U$ as interference. More specifically, a potential interference path is shown at 150. In this potential interference path 150, the return link signal of the second radiotelephone 120b at carrier frequency $f'_U$ interferes with satellite communications. This interference would generally be strongest when $f'_U = f_U$, because, in that case, the same return link frequency would be used for space-based component and ancillary terrestrial component communications over the same satellite radiotelephone cell, and no spatial discrimination between satellite radiotelephone cells would appear to exist.

Still referring to FIG. 1, embodiments of satellite radiotelephone systems/methods 100 can include at least one gateway 160 that can include an antenna 160a and an electronics system 160b that can be connected to other networks 162 including terrestrial and/or other radiotelephone networks. The gateway 160 also communicates with the space-based component 110 over a satellite feeder link 112. The gateway 160 also communicates with the ancillary terrestrial component 140, generally over a terrestrial link 142.

Still referring to FIG. 1, an Interference Reducer (IR) 170a also may be provided at least partially in the ancillary terrestrial component electronics system 140b. Alternatively or additionally, an interference reducer 170b may be provided at least partially in the gateway electronics system 160b. In yet other alternatives, the interference reducer may be provided at least partially in other components of the cellular satellite system/method 100 instead of or in addition to the interference reducer 170a and/or 170b. The interference reducer is responsive to the space-based component 110 and to the ancillary terrestrial component 140, and is configured to reduce the interference from the wireless communications that are received by the space-based component 110 and is at least partially generated by the second radiotelephone 120b in the satellite radiotelephone cell 130 over the satellite radiotelephone frequency $f'_U$. The interference reducer 170a and/or 170b uses the wireless communications $f'_U$ that are intended for the ancillary terrestrial component 140 from the second radiotelephone 120b in the satellite radiotelephone cell 130 using the satellite radiotelephone frequency $f'_U$ to communicate with the ancillary terrestrial component 140.

In embodiments of the invention, as shown in FIG. 1, the ancillary terrestrial component 140 generally is closer to the first and second radiotelephones 120a and 120b, respectively, than is the space-based component 110, such that the wireless communications from the second radiotelephone 120b are received by the ancillary terrestrial component 140 prior to being received by the space-based component 110. The interference reducer 170a and/or 170b is configured to generate an interference cancellation signal comprising, for example, at least one delayed replica of the wireless communications from the second radiotelephone 120b that are received by the ancillary terrestrial component 140, and to subtract the delayed replica of the wireless communications from the second radiotelephone 120b that are received by the ancillary terrestrial component 140 from the wireless communications that are received from the space-based component 110. The interference reduction signal may be transmitted from the ancillary terrestrial component 140 to the gateway 160 over link 142 and/or using other conventional techniques.

Thus, adaptive interference reduction techniques may be used to at least partially cancel the interfering signal, so that the same, or other nearby, satellite radiotelephone uplink frequency can be used in a given cell for communications by radiotelephones 120 with the satellite 110 and with the ancillary terrestrial component 140. Accordingly, all frequencies that are assigned to a given cell 130 may be used for both radiotelephone 120 communications with the space-based component 110 and with the ancillary terrestrial component 140. Conventional systems may avoid terrestrial reuse of frequencies within a given satellite cell that are being used within the satellite cell for satellite communications. Stated differently, conventionally, only frequencies used by other satellite cells may be candidates for terrestrial reuse within a given satellite cell. Beam-to-beam spatial isolation that is provided by the satellite system was relied upon to reduce or minimize the level of interference from the terrestrial operations into the satellite operations. In sharp contrast, embodiments of the invention can use an interference reducer to allow all frequencies assigned to a satellite cell to be used terrestrially and for satellite radiotelephone communications.

Embodiments of the invention according to FIG. 1 may arise from a realization that the return link signal from the second radiotelephone 120b at $f_U$ generally will be received and processed by the ancillary terrestrial component 140 much earlier relative to the time when it will arrive at the satellite gateway 160 from the space-based component 110 via the interference path 150. Accordingly, the interference signal at the satellite gateway 160b can be at least partially canceled. Thus, as shown in FIG. 1, an interference cancellation signal, such as the demodulated ancillary terrestrial component signal, can be sent to the satellite gateway 160b by the interference reducer 170a in the ancillary terrestrial component 140, for example using link 142. In the interference reducer 170b at the gateway 160b, a weighted (in amplitude and/or phase) replica of the signal may be formed using, for example, adaptive transversal filter techniques that are well known to those having skill in the art. Then, a transversal filter output signal is subtracted from the aggregate received satellite signal at frequency $f_U$ that contains desired as well as interference signals. Thus, the interference cancellation need not degrade the signal-to-noise ratio of the desired signal at the gateway 160, because a regenerated (noise-free) terrestrial signal, for example as regenerated by the ancillary terrestrial component 140, can be used to perform interference suppression.

Figure 2:
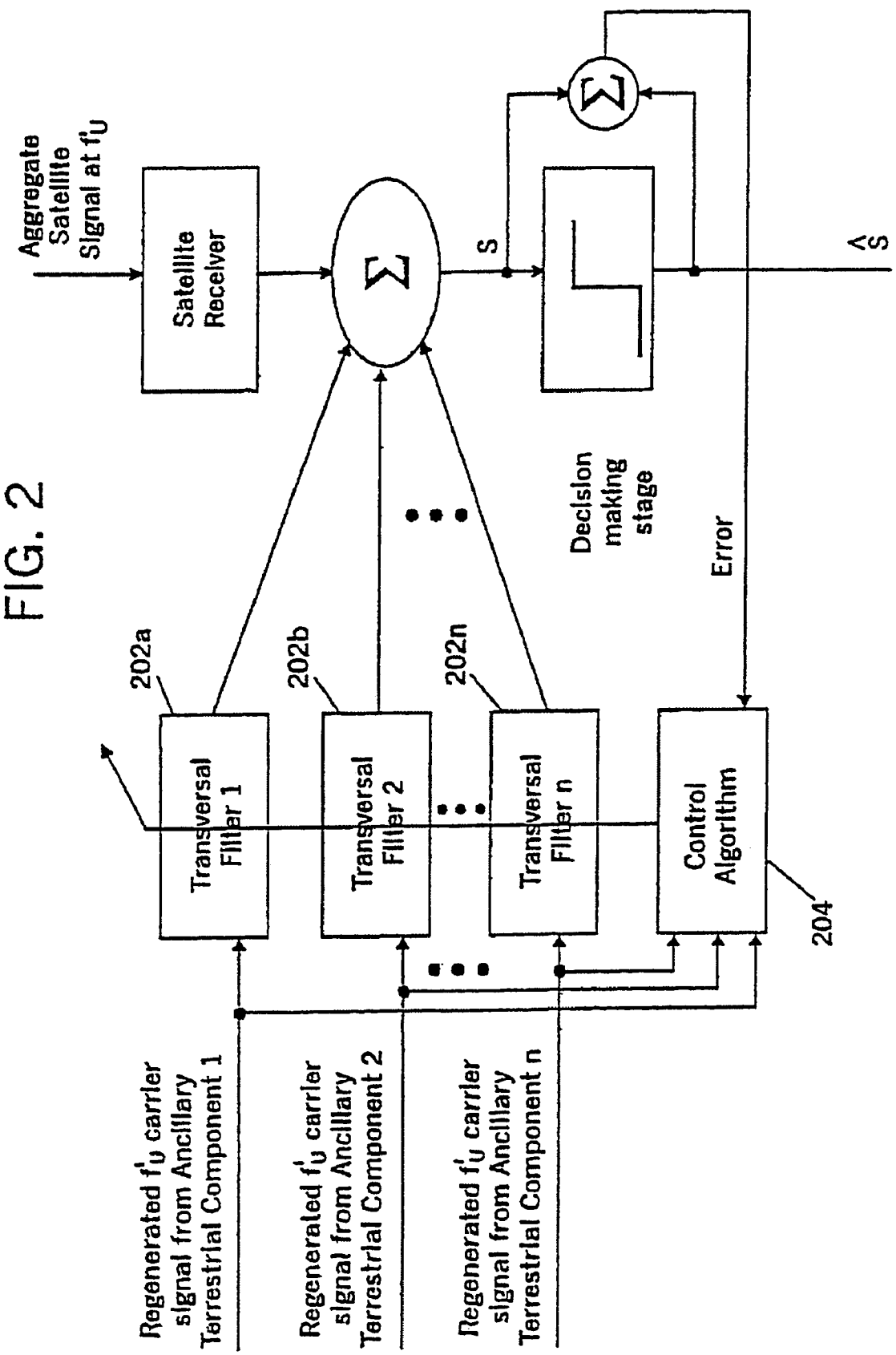
FIG. 2 is a block diagram of adaptive interference reducers according to embodiments of the present invention.

FIG. 2 is a block diagram of embodiments of adaptive interference cancellers that may be located in the ancillary terrestrial component 140, in the gateway 160, and/or in another component of the cellular radiotelephone system 100. As shown in FIG. 2, one or more control algorithms 204, known to those having skill in the art, may be used to adaptively adjust the coefficients of a plurality of transversal filters 202a–202n. Adaptive algorithms, such as Least Mean Square Error (LMSE), Kalman, Fast Kalman, Zero Forcing and/or various combinations thereof or other techniques may be used. It will be understood by those having skill in the art that the architecture of FIG. 2 may be used with an LMSE algorithm. However, it also will be understood by those having skill in the art that conventional architectural modifications may be made to facilitate other control algorithms.

Figure 3:
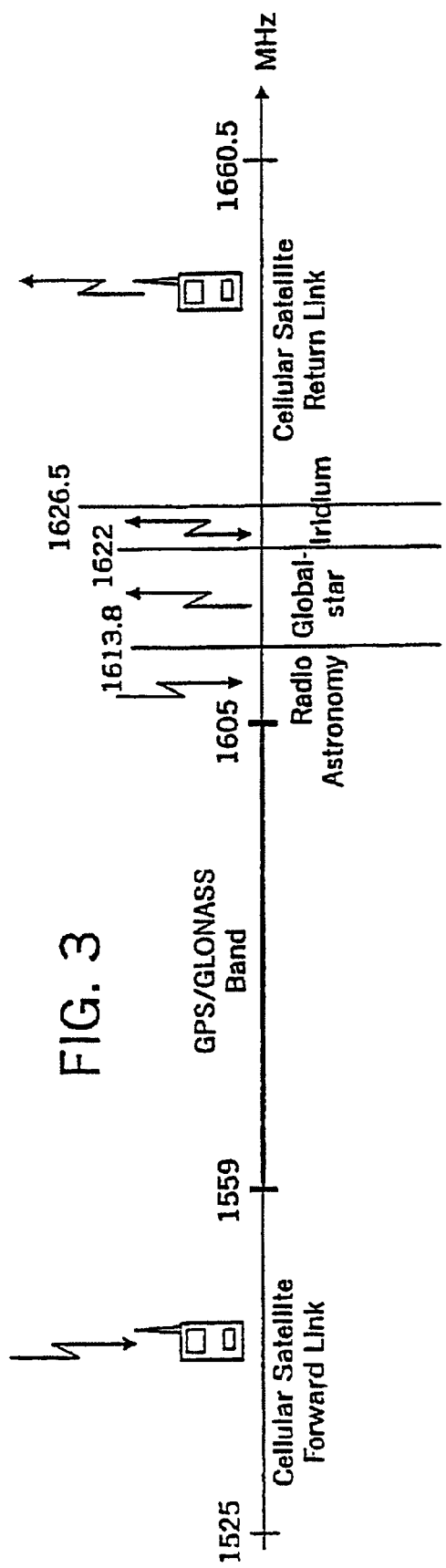
FIG. 3 is a spectrum diagram that illustrates satellite L-band frequency allocations.

Additional embodiments of the invention now will be described with reference to FIG. 3, which illustrates L-band frequency allocations including cellular radiotelephone system forward links and return links. As shown in FIG. 3, the space-to-ground L-band forward link (downlink) frequencies are assigned from 1525 MHz to 1559 MHz. The ground-to-space L-band return link (uplink) frequencies occupy the band from 1626.5 MHz to 1660.5 MHz. Between the forward and return L-band links lie the GPS/GLONASS radionavigation band (from 1559 MHz to 1605 MHz).

In the detailed description to follow, GPS/GLONASS will be referred to simply as GPS for the sake of brevity. Moreover, the acronyms ATC and SBC will be used for the ancillary terrestrial component and the space-based component, respectively, for the sake of brevity.

As is known to those skilled in the art, GPS receivers may be extremely sensitive since they are designed to operate on very weak spread-spectrum radionavigation signals that arrive on the earth from a GPS satellite constellation. As a result, GPS receivers may to be highly susceptible to in-band interference. ATCs that are configured to radiate L-band frequencies in the forward satellite band (1525 to 1559 MHz) can be designed with very sharp out-of-band emissions filters to satisfy the stringent out-of-band spurious emissions desires of GPS.

Referring again to FIG. 1, some embodiments of the invention can provide systems and methods that can allow an ATC 140 to configure itself in one of at least two modes. In accordance with a first mode, which may be a standard mode and may provide highest capacity, the ATC 140 transmits to the radiotelephones 120 over the frequency range from 1525 MHz to 1559 MHz, and receives transmissions from the radiotelephones 120 in the frequency range from 1626.5 MHz to 1660.5 MHz, as illustrated in FIG. 3. In contrast, in a second mode of operation, the ATC 140 transmits wireless communications to the radiotelephones 120 over a modified range of satellite band forward link (downlink) frequencies. The modified range of satellite band forward link frequencies may be selected to reduce, compared to the unmodified range of satellite band forward link frequencies, interference with wireless receivers such as GPS receivers that operate outside the range of satellite band forward link frequencies.

Many modified ranges of satellite band forward link frequencies may be provided according to embodiments of the present invention. In some embodiments, the modified range of satellite band forward link frequencies can be limited to a subset of the original range of satellite band forward link frequencies, so as to provide a guard band of unused satellite band forward link frequencies. In other embodiments, all of the satellite band forward link frequencies are used, but the wireless communications to the radiotelephones are modified in a manner to reduce interference with wireless receivers that operate outside the range of satellite band forward link frequencies. Combinations and subcombinations of these and/or other techniques also may be used, as will be described below.

It also will be understood that embodiments of the invention that will now be described in connection with FIGS. 4–12 will be described in terms of multiple mode ATCs 140 that can operate in a first standard mode using the standard forward and return links of FIG. 3, and in a second or alternate mode that uses a modified range of satellite band forward link frequencies and/or a modified range of satellite band return link frequencies. These multiple mode ATCs can operate in the second, non-standard mode, as long as desirable, and can be switched to standard mode otherwise. However, other embodiments of the present invention need not provide multiple mode ATCs but, rather, can provide ATCs that operate using the modified range of satellite band forward link and/or return link frequencies.

Embodiments of the invention now will be described, wherein an ATC operates with an SBC that is configured to receive wireless communications from radiotelephones over a first range of satellite band return link frequencies and to transmit wireless communications to the radiotelephones over a second range of satellite band forward link frequencies that is spaced apart from the first range. According to these embodiments, the ATC is configured to use at least one time division duplex frequency to transmit wireless communications to the radiotelephones and to receive wireless communications from the radiotelephones at different times. In particular, in some embodiments, the at least one time division duplex frequency that is used to transmit wireless communications to the radiotelephones and to receive wireless communications from the radiotelephones at different times, comprises a frame including a plurality of slots. At least a first one of the slots is used to transmit wireless communications to the radiotelephones and at least a second one of the slots is used to receive wireless communications from the radiotelephones. Thus, in some embodiments, the ATC transmits and receives, in Time Division Duplex (TDD) mode, using frequencies from 1626.5 MHz to 1660.5 MHz. In some embodiments, all ATCs across the entire network may have the stated configuration/reconfiguration flexibility. In other embodiments, only some ATCs may be reconfigurable.

Figure 5:
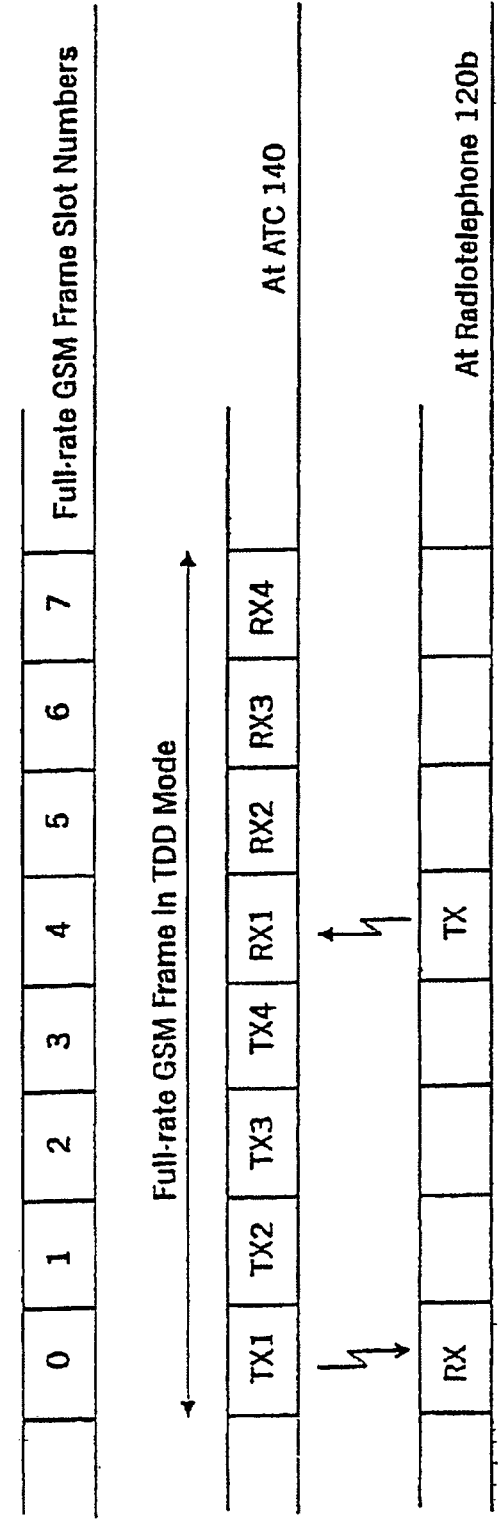
FIG. 5 illustrates time division duplex frame structures according to embodiments of the present invention.
Figure 4:
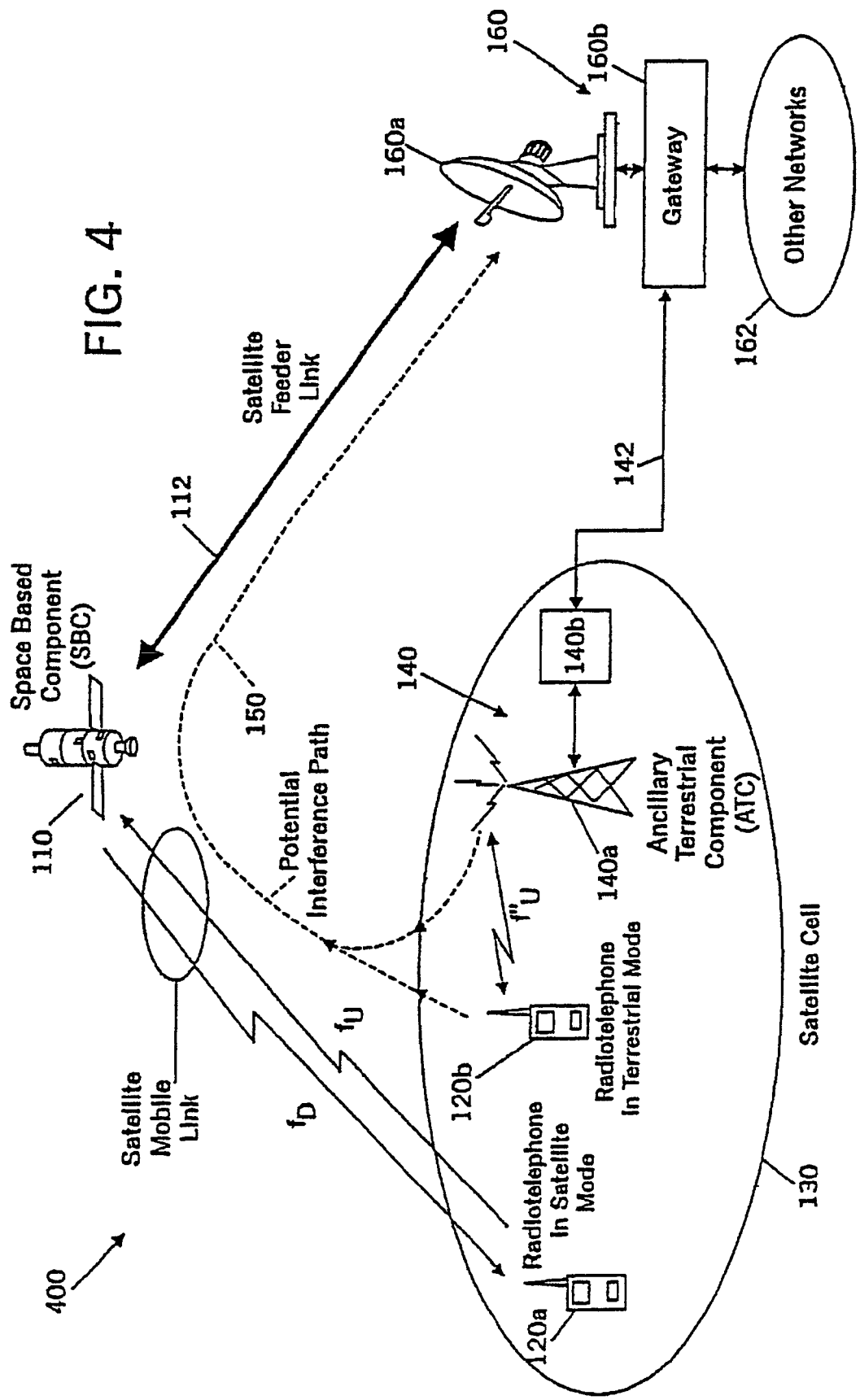
FIG. 4 is a schematic diagram of cellular satellite systems and methods according to other embodiments of the present invention.

FIG. 4 illustrates satellite systems and methods 400 according to some embodiments of the invention, including an ATC 140 communicating with a radiotelephone 120b using a carrier frequency $f''_U$ in TDD mode. FIG. 5 illustrates an embodiment of a TDD frame structure. Assuming full-rate GSM (eight time slots per frame), up to four full-duplex voice circuits can be supported by one TDD carrier. As shown in FIG. 5, the ATC 140 transmits to the radiotelephone 120b over, for example, time slot number 0. The radiotelephone 120b receives and replies back to the ATC 140 over, for example, time slot number 4. Time slots number 1 and 5 may be used to establish communications with another radiotelephone, and so on.

A Broadcast Control CHannel (BCCH) is preferably transmitted from the ATC 140 in standard mode, using a carrier frequency from below any guard band exclusion region. In other embodiments, a BCCH also can be defined using a TDD carrier. In any of these embodiments, radiotelephones in idle mode can, per established GSM methodology, monitor the BCCH and receive system-level and paging information. When a radiotelephone is paged, the system decides what type of resource to allocate to the radiotelephone in order to establish the communications link. Whatever type of resource is allocated for the radiotelephone communications channel (TDD mode or standard mode), the information is communicated to the radiotelephone, for example as part of the call initialization routine, and the radiotelephone configures itself appropriately.

It may be difficult for the TDD mode to co-exist with the standard mode over the same ATC, due, for example, to the ATC receiver LNA stage. In particular, assuming a mixture of standard and TDD mode GSM carriers over the same ATC, during the part of the frame when the TDD carriers are used to serve the forward link (when the ATC is transmitting TDD) enough energy may leak into the receiver front end of the same ATC to desensitize its LNA stage.

Techniques can be used to suppress the transmitted ATC energy over the 1600 MHz portion of the band from desensitizing the ATC's receiver LNA, and thereby allow mixed standard mode and TDD frames. For example, isolation between outbound and inbound ATC front ends and/or antenna system return loss may be increased or maximized. A switchable band-reject filter may be placed in front of the LNA stage. This filter would be switched in the receiver chain (prior to the LNA) during the part of the frame when the ATC is transmitting TDD, and switched out during the rest of the time. An adaptive interference canceller can be configured at RF (prior to the LNA stage). If such techniques are used, suppression of the order of 70 dB can be attained, which may allow mixed standard mode and TDD frames. However, the ATC complexity and/or cost may increase.

Thus, even though ATC LNA desensitization may be reduced or eliminated, it may use significant special engineering and attention and may not be economically worth the effort. Other embodiments, therefore, may keep TDD ATCs pure TDD, with the exception, perhaps, of the BCCH carrier which may not be used for traffic but only for broadcasting over the first part of the frame, consistent with TDD protocol. Moreover, Random Access CHannel (RACH) bursts may be timed so that they arrive at the ATC during the second half of the TDD frame. In some embodiments, all TDD ATCs may be equipped to enable reconfiguration in response to a command.

It is well recognized that during data communications or other applications, the forward link may use transmissions at higher rates than the return link. For example, in web browsing with a radiotelephone, mouse clicks and/or other user selections typically are transmitted from the radiotelephone to the system. The system, however, in response to a user selection, may have to send large data files to the radiotelephone. Hence, other embodiments of the invention may be configured to enable use of an increased or maximum number of time slots per forward GSM carrier frame, to provide a higher downlink data rate to the radiotelephones.

Thus, when a carrier frequency is configured to provide service in TDD mode, a decision may be made as to how many slots will be allocated to serving the forward link, and how many will be dedicated to the return link. Whatever the decision is, it may be desirable that it be adhered to by all TDD carriers used by the ATC, in order to reduce or avoid the LNA desensitization problem described earlier. In voice communications, the partition between forward and return link slots may be made in the middle of the frame as voice activity typically is statistically bidirectionally symmetrical. Hence, driven by voice, the center of the frame may be where the TDD partition is drawn.

To increase or maximize forward link throughput in data mode, data mode TDD carriers according to embodiments of the invention may use a more spectrally efficient modulation and/or protocol, such as the EDGE modulation and/or protocol, on the forward link slots. The return link slots may be based on a less spectrally efficient modulation and/or protocol such as the GPRS (GMSK) modulation and/or protocol. The EDGE modulation/protocol and the GPRS modulation/protocol are well known to those having skill in the art, and need not be described further herein. Given an EDGE forward/GPRS return TDD carrier strategy, up to (384/2)=192 kbps may be supported on the forward link while on the return link the radiotelephone may transmit at up to (115/2)≈64 kbps.

In other embodiments, it also is possible to allocate six time slots of an eight-slot frame for the forward link and only two for the return link. In these embodiments, for voice services, given the statistically symmetric nature of voice, the return link vocoder may need to be comparable with quarter-rate GSM, while the forward link vocoder can operate at full-rate GSM, to yield six full-duplex voice circuits per GSM TDD-mode carrier (a voice capacity penalty of 25%). Subject to this non-symmetrical partitioning strategy, data rates of up to (384)(6/8)=288 kbps may be achieved on the forward link, with up to (115)(2/8)≈32 kbps on the return link.

Figure 6:
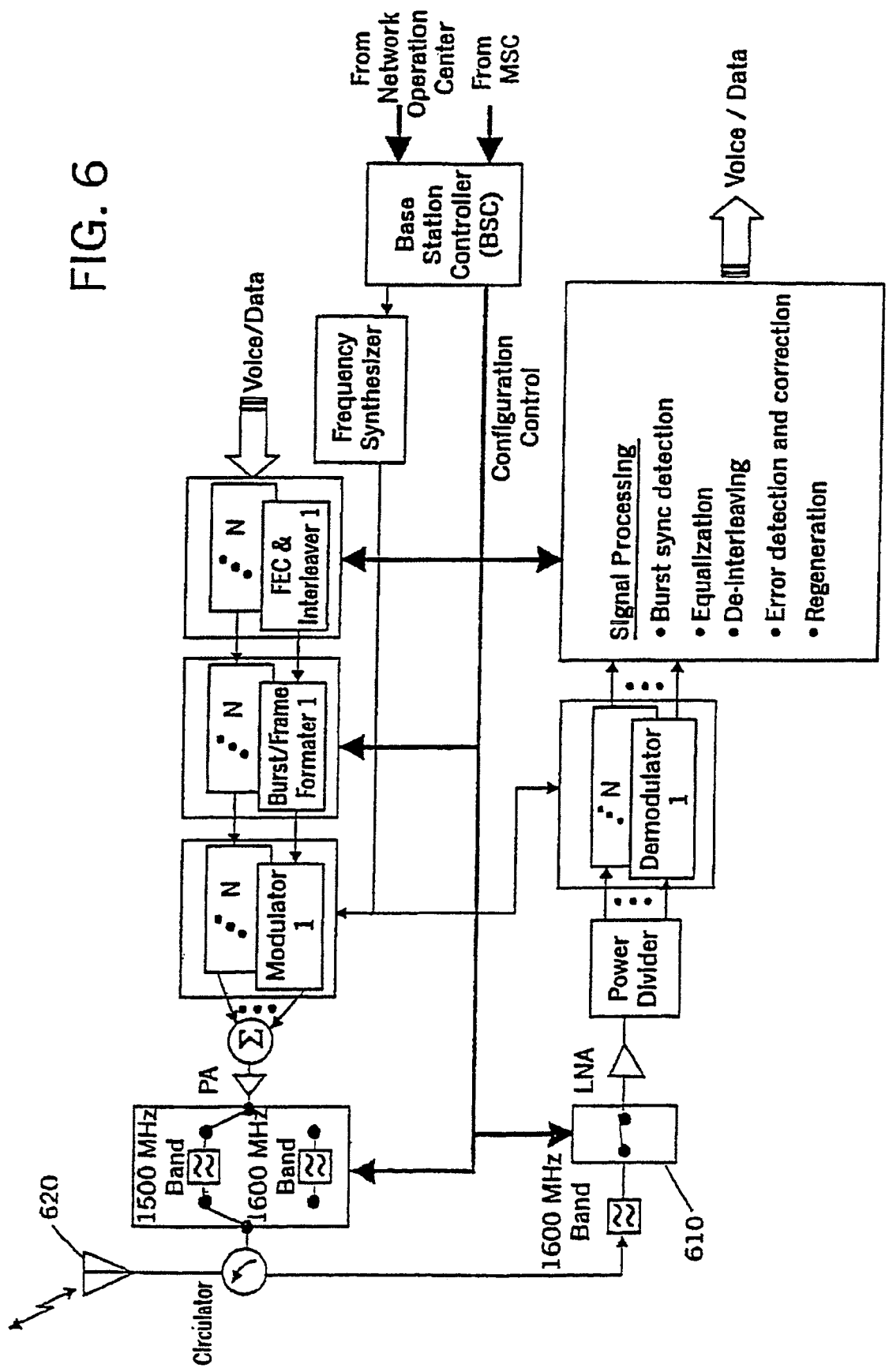
FIG. 6 is a block diagram of architectures of ancillary terrestrial components according to embodiments of the invention.

FIG. 6 depicts an ATC architecture according to embodiments of the invention, which can lend itself to automatic configuration between the two modes of standard GSM and TDD GSM on command, for example, from a Network Operations Center (NOC) via a Base Station Controller (BSC). It will be understood that in these embodiments, an antenna 620 can correspond to the antenna 140$a$ of FIGS. 1 and 4, and the remainder of FIG. 6 can correspond to the electronics system 140$b$ of FIGS. 1 and 4. If a reconfiguration command for a particular carrier, or set of carriers, occurs while the carrier(s) are active and are supporting traffic, then, via the in-band signaling Fast Associated Control CHannel (FACCH), all affected radiotelephones may be notified to also reconfigure themselves and/or switch over to new resources. If carrier(s) are reconfigured from TDD mode to standard mode, automatic reassignment of the carrier(s) to the appropriate standard-mode ATCs, based, for example, on capacity demand and/or reuse pattern can be initiated by the NOC. If, on the other hand, carrier(s) are reconfigured from standard mode to TDD mode, automatic reassignment to the appropriate TDD-mode ATCs can take place on command from the NOC.

Still referring to FIG. 6, a switch 610 may remain closed when carriers are to be demodulated in the standard mode. In TDD mode, this switch 610 may be open during the first half of the frame, when the ATC is transmitting, and closed during the second half of the frame, when the ATC is receiving. Other embodiments also may be provided.

FIG. 6 assumes N transceivers per ATC sector, where N can be as small as one, since a minimum of one carrier per sector generally is desired. Each transceiver is assumed to operate over one GSM carrier pair (when in standard mode) and can thus support up to eight full-duplex voice circuits, neglecting BCCH channel overhead. Moreover, a standard GSM carrier pair can support sixteen full-duplex voice circuits when in half-rate GSM mode, and up to thirty two full-duplex voice circuits when in quarter-rate GSM mode.

Figure 7:
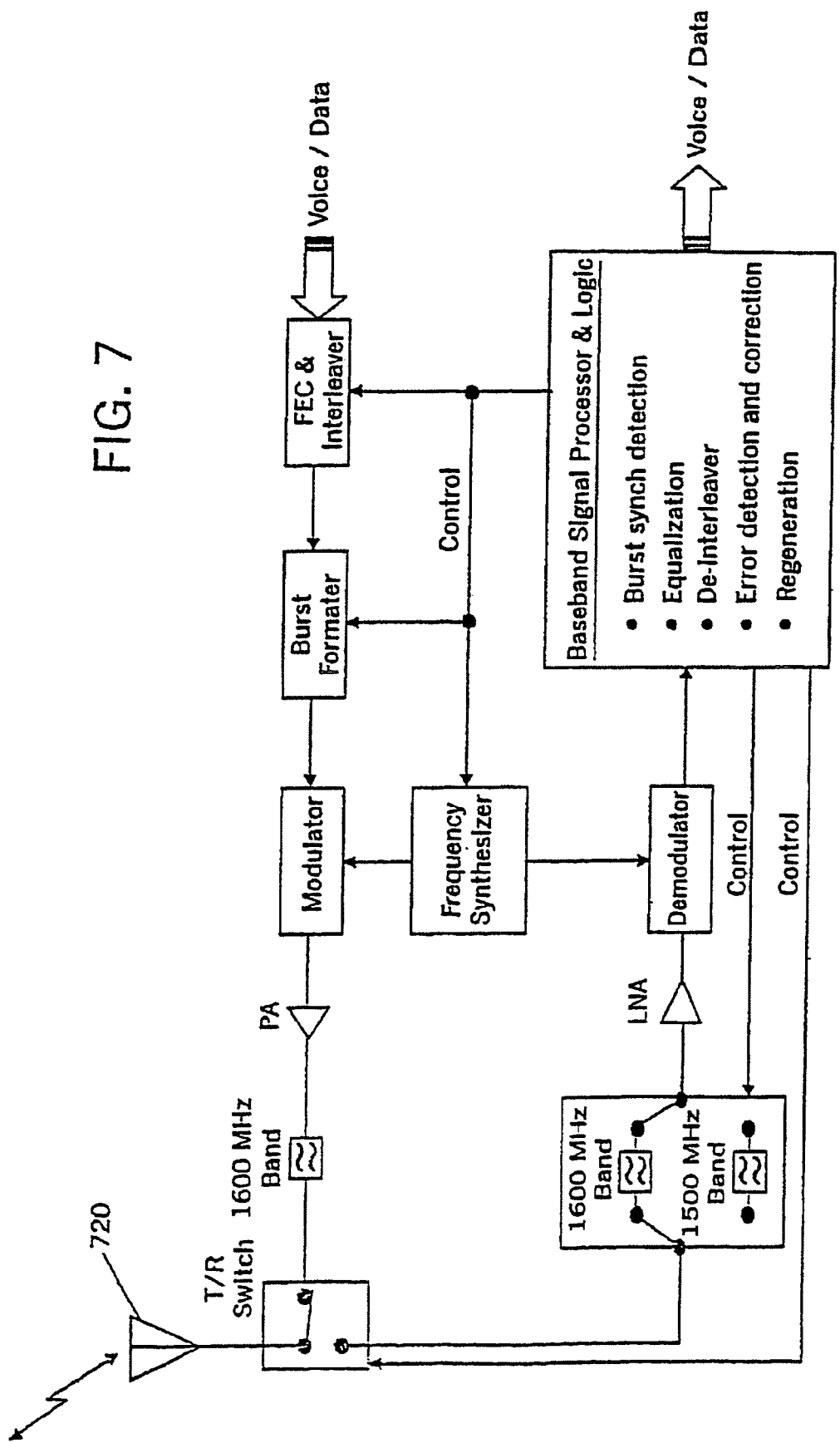
FIG. 7 is a block diagram of architectures of reconfigurable radiotelephones according to embodiments of the invention.

When in TDD mode, the number of full duplex voice circuits may be reduced by a factor of two, assuming the same vocoder. However, in TDD mode, voice service can be offered via the half-rate GSM vocoder with almost imperceptible quality degradation, in order to maintain invariant voice capacity. FIG. 7 is a block diagram of a reconfigurable radiotelephone architecture that can communicate with a reconfigurable ATC architecture of FIG. 6. In FIG. 7, an antenna 720 is provided, and the remainder of FIG. 7 can provide embodiments of an electronics system for the radiotelephone.

It will be understood that the ability to reconfigure ATCs and radiotelephones according to embodiments of the invention may be obtained at a relatively small increase in cost. The cost may be mostly in Non-Recurring Engineering (NRE) cost to develop software. Some recurring cost may also be incurred, however, in that at least an additional RF filter and a few electronically controlled switches may be used per ATC and radiotelephone. All other hardware/software can be common to standard-mode and TDD-mode GSM.

Referring now to FIG. 8, other radiotelephone systems and methods according to embodiments of the invention now will be described. In these embodiments, the modified second range of satellite band forward link frequencies includes a plurality of frequencies in the second range of satellite band forward link frequencies that are transmitted by the ATCs to the radiotelephones at a power level, such as maximum power level, that monotonically decreases as a function of (increasing) frequency. More specifically, as will be described below, in some embodiments, the modified second range of satellite band forward link frequencies includes a subset of frequencies proximate to a first or second end of the range of satellite band forward link frequencies that are transmitted by the ATC to the radiotelephones at a power level, such as a maximum power level, that monotonically decreases toward the first or second end of the second range of satellite band forward link frequencies. In still other embodiments, the first range of satellite band return link frequencies is contained in an L-band of satellite frequencies above GPS frequencies and the second range of satellite band forward link frequencies is contained in the L-band of satellite frequencies below the GPS frequencies. The modified second range of satellite band forward link frequencies includes a subset of frequencies proximate to an end of the second range of satellite band forward link frequencies adjacent the GPS frequencies that are transmitted by the ATC to the radiotelephones at a power level, such as a maximum power level, that monotonically decreases toward the end of the second range of satellite band forward link frequencies adjacent the GPS frequencies.

Without being bound by any theory of operation, a theoretical discussion of the mapping of ATC maximum power levels to carrier frequencies according to embodiments of the present invention now will be described. Referring to FIG. 8, let $v=\mathcal{F}F(\rho)$ represent a mapping from the power ($\rho$) domain to the frequency ($v$) range. The power ($\rho$) is the power that an ATC uses or should transmit in order to reliably communicate with a given radiotelephone. This power may depend on many factors such as the radiotelephone's distance from the ATC, the blockage between the radiotelephone and the ATC, the level of multipath fading in the channel, etc., and as a result, will, in general, change as a function of time. Hence, the power used generally is determined adaptively (iteratively) via closed-loop power control, between the radiotelephone and ATC.

The frequency ($v$) is the satellite carrier frequency that the ATC uses to communicate with the radiotelephone. According to embodiments of the invention, the mapping $\mathcal{F}$ is a monotonically decreasing function of the independent variable $\rho$. Consequently, in some embodiments, as the maximum ATC power increases, the carrier frequency that the ATC uses to establish and/or maintain the communications link decreases. FIG. 8 illustrates an embodiment of a piecewise continuous monotonically decreasing (stair-case) function. Other monotonic functions may be used, including linear and/or nonlinear, constant and/or variable decreases. FACCH or Slow Associated Control CHannel (SACCH) messaging may be used in embodiments of the invention to facilitate the mapping adaptively and in substantially real time.

FIG. 9 depicts an ideal cell according to embodiments of the invention, where, for illustration purposes, three power regions and three associated carrier frequencies (or carrier frequency sets) are being used to partition a cell. For simplicity, one ATC transmitter at the center of the idealized cell is assumed with no sectorization. In embodiments of FIG. 9, the frequency (or frequency set) $f_I$ is taken from substantially the upper-most portion of the L-band forward link frequency set, for example from substantially close to 1559 MHz (see FIG. 3). Correspondingly, the frequency (or frequency set) $f_M$ is taken from substantially the central portion of the L-band forward link frequency set (see FIG. 3). In concert with the above, the frequency (or frequency set) $f_O$ is taken from substantially the lowest portion of the L-band forward link frequencies, for example close to 1525 MHz (see FIG. 3).

Thus, according to embodiments of FIG. 9, if a radiotelephone is being served within the outer-most ring of the cell, that radiotelephone is being served via frequency $f_O$. This radiotelephone, being within the furthest area from the ATC, has (presumably) requested maximum (or near maximum) power output from the ATC. In response to the maximum (or near maximum) output power request, the ATC uses its a priori knowledge of power-to-frequency mapping, such as a three-step staircase function of FIG. 9. Thus, the ATC serves the radiotelephone with a low-value frequency taken from the lowest portion of the mobile L-band forward link frequency set, for example, from as close to 1525 MHz as possible. This, then, can provide additional safeguard to any GPS receiver unit that may be in the vicinity of the ATC.

Embodiments of FIG. 9 may be regarded as idealized because they associate concentric ring areas with carrier frequencies (or carrier frequency sets) used by an ATC to serve its area. In reality, concentric ring areas generally will not be the case. For example, a radiotelephone can be close to the ATC that is serving it, but with significant blockage between the radiotelephone and the ATC due to a building. This radiotelephone, even though relatively close to the ATC, may also request maximum (or near maximum) output power from the ATC. With this in mind, FIG. 10 may depict a more realistic set of area contours that may be associated with the frequencies being used by the ATC to serve its territory, according to embodiments of the invention. The frequency (or frequency set) $f_I$ may be reused in the immediately adjacent ATC cells owing to the limited geographical span associated with $f_I$ relative to the distance between cell centers. This may also hold for $f_M$.

Figure 11:
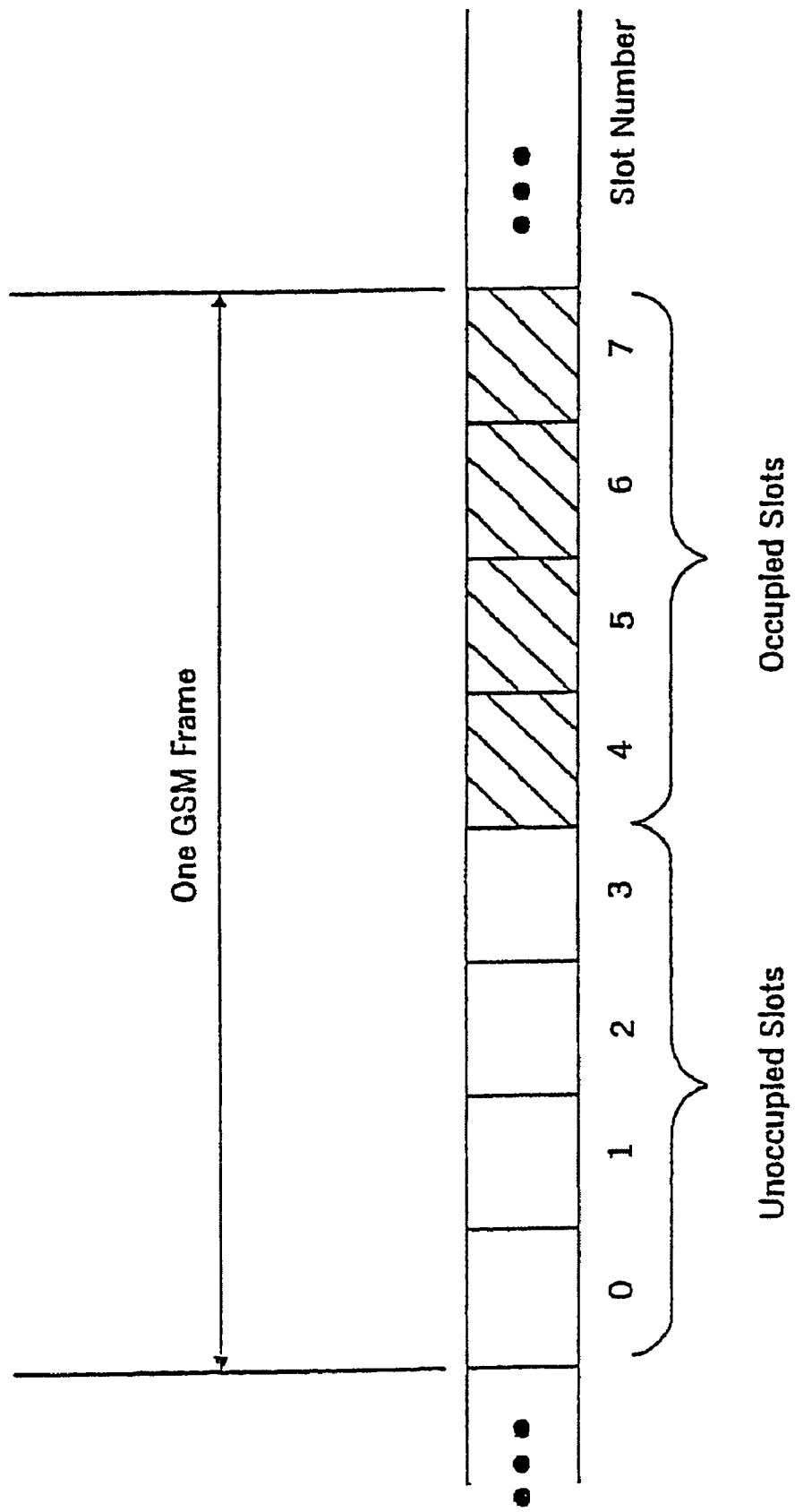
FIG. 11 illustrates two or more contiguous slots in a frame that are unoccupied according to embodiments of the present invention.

Referring now to FIG. 11, other modified second ranges of satellite band forward link frequencies that can be used by ATCs according to embodiments of the present invention now will be described. In these embodiments, at least one frequency in the modified second range of satellite band forward link frequencies that is transmitted by the ATC to the radiotelephones comprises a frame including a plurality of slots. In these embodiments, at least two contiguous slots in the frame that is transmitted by the ATC to the radiotelephones are left unoccupied. In other embodiments, three contiguous slots in the frame that is transmitted by the ATC to the radiotelephones are left unoccupied. In yet other embodiments, at least two contiguous slots in the frame that is transmitted by the ATC to the radiotelephones are transmitted at lower power than remaining slots in the frame. In still other embodiments, three contiguous slots in the frame that is transmitted by the ATC to the radiotelephones are transmitted at lower power than remaining slots in the frame. In yet other embodiments, the lower power slots may be used with first selected ones of the radiotelephones that are relatively close to the ATC and/or are experiencing relatively small signal blockage, and the remaining slots are transmitted at higher power to second selected ones of the radiotelephones that are relatively far from the ATC and/or are experiencing relatively high signal blockage.

Stated differently, in accordance with some embodiments of the invention, only a portion of the TDMA frame is utilized. For example, only the first four (or last four, or any contiguous four) time slots of a full-rate GSM frame are used to support traffic. The remaining slots are left unoccupied (empty). In these embodiments, capacity may be lost. However, as has been described previously, for voice services, half-rate and even quarter-rate GSM may be invoked to gain capacity back, with some potential degradation in voice quality. The slots that are not utilized preferably are contiguous, such as slots 0 through 3 or 4 through 7 (or 2 through 5, etc.). The use of non-contiguous slots such as 0, 2, 4, and 6, for example, may be less desirable. FIG. 11 illustrates four slots (4–7) being used and four contiguous slots (0–3) being empty in a GSM frame.

It has been found experimentally, according to these embodiments of the invention, that GPS receivers can perform significantly better when the interval between interference bursts is increased or maximized. Without being bound by any theory of operation, this effect may be due to the relationship between the code repetition period of the GPS C/A code (1 msec.) and the GSM burst duration (about 0.577 msec.). With a GSM frame occupancy comprising alternate slots, each GPS signal code period can experience at least one "hit", whereas a GSM frame occupancy comprising four to five contiguous slots allows the GPS receiver to derive sufficient clean information, so as to "flywheel" through the error events.

According to other embodiments of the invention, embodiments of FIGS. 8–10 can be combined with embodiments of FIG. 11. Furthermore, according to other embodiments of the invention, if an $f_I$ carrier of FIGS. 9 or 10 is underutilized, because of the relatively small footprint of the inner-most region of the cell, it may be used to support additional traffic over the much larger outermost region of the cell.

Figure 12:
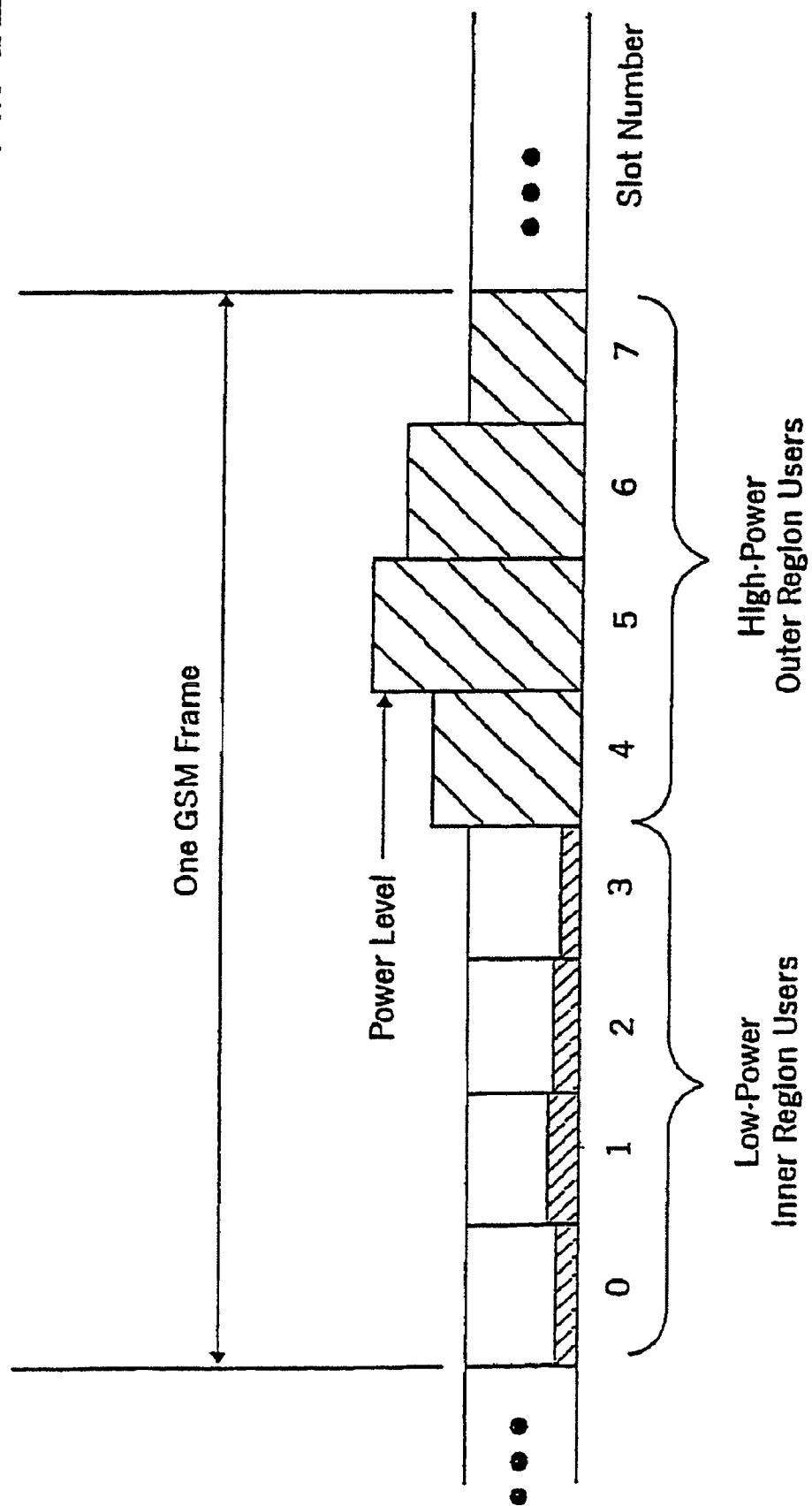
FIG. 12 illustrates loading of two or more contiguous slots with lower power transmissions according to embodiments of the present invention.

Thus, for example, assume that only the first four slots in each frame of $f_I$ are being used for inner region traffic. In embodiments of FIGS. 8–10, these four $f_I$ slots are carrying relatively low power bursts, for example of the order of 100 mW or less, and may, therefore, appear as (almost) unoccupied from an interference point of view. Loading the remaining four (contiguous) time slots of $f_I$ with relatively high-power bursts may have negligible effect on a GPS receiver because the GPS receiver would continue to operate reliably based on the benign contiguous time interval occupied by the four low-power GSM bursts. FIG. 12 illustrates embodiments of a frame at carrier $f_I$ supporting four low-power (inner interval) users and four high-power (outer interval) users. In fact, embodiments illustrated in FIG. 12 may be a preferred strategy for the set of available carrier frequencies that are closest to the GPS band. These embodiments may avoid undue capacity loss by more fully loading the carrier frequencies.

The experimental finding that interference from GSM carriers can be relatively benign to GPS receivers provided that no more than, for example, 5 slots per 8 slot GSM frame are used in a contiguous fashion can be very useful. It can be particularly useful since this experimental finding may hold even when the GSM carrier frequency is brought very close to the GPS band (as close as 1558.5 MHz) and the power level is set relatively high. For example, with five contiguous time slots per frame populated, the worst-case measured GPS receiver may attain at least 30 dB of desensitization margin, over the entire ATC service area, even when the ATC is radiating at 1558.5 MHz. With four contiguous time slots per frame populated, an additional 10 dB desensitization margin may be gained for a total of 40 dB for the worst-case measured GPS receiver, even when the ATC is radiating at 1558.5 MHz.

There still may be concern about the potential loss in network capacity (especially in data mode) that may be incurred over the frequency interval where embodiments of FIG. 11 are used to underpopulate the frame. Moreover, even though embodiments of FIG. 12 can avoid capacity loss by fully loading the carrier, they may do so subject to the constraint of filling up the frame with both low-power and high-power users. Moreover, if forward link carriers are limited to 5 contiguous high power slots per frame, the maximum forward link data rate per carrier that may be aimed at a particular user may become proportionately less.

Therefore, in other embodiments, carriers which are subject to contiguous empty/low power slots are not used for the forward link. Instead, they are used for the return link. Consequently, in some embodiments, at least part of the ATC is configured in reverse frequency mode compared to the SBC in order to allow maximum data rates over the forward link throughout the entire network. On the reverse frequency return link, a radiotelephone may be limited to a maximum of 5 slots per frame, which can be adequate for the return link. Whether the five available time slots per frame, on a reverse frequency return link carrier, are assigned to one radiotelephone or to five different radiotelephones, they can be assigned contiguously in these embodiments. As was described in connection with FIG. 12, these five contiguous slots can be assigned to high-power users while the remaining three slots may be used to serve low-power users.

Other embodiments may be based on operating the ATC entirely in reverse frequency mode compared to the SBC. In these embodiments, an ATC transmits over the satellite return link frequencies while radiotelephones respond over the satellite forward link frequencies. If sufficient contiguous spectrum exists to support CDMA technologies, and in particular the emerging Wideband-CDMA 3G standard, the ATC forward link can be based on Wideband-CDMA to increase or maximize data throughput capabilities. Interference with GPS may not be an issue since the ATCs transmit over the satellite return link in these embodiments. Instead, interference may become a concern for the radiotelephones. Based, however, on embodiments of FIGS. 11–12, the radiotelephones can be configured to transmit GSM since ATC return link rates are expected, in any event, to be lower than those of the forward link. Accordingly, the ATC return link may employ GPRS-based data modes, possibly even EDGE. Thus, return link carriers that fall within a predetermined frequency interval from the GPS band-edge of 1559 MHz, can be under loaded, per embodiments of FIG. 11 or 12, to satisfy GPS interference concerns.

Finally, other embodiments may use a partial or total reverse frequency mode and may use CDMA on both forward and return links. In these embodiments, the ATC forward link to the radiotelephones utilizes the frequencies of the satellite return link (1626.5 MHz to 1660.5 MHz) whereas the ATC return link from the radiotelephones uses the frequencies of the satellite forward link (1525 MHz to 1559 MHz). The ATC forward link can be based on an existing or developing CDMA technology (e.g., IS-95, Wideband-CDMA, etc.). The ATC network return link can also be based on an existing or developing CDMA technology provided that the radiotelephone's output is gated to cease transmissions for approximately 3 msec once every T msec. In some embodiments, T will be greater than or equal to 6 msec.

This gating may not be needed for ATC return link carriers at approximately 1550 MHz or below. This gating can reduce or minimize out-of-band interference (desensitization) effects for GPS receivers in the vicinity of an ATC. To increase the benefit to GPS, the gating between all radiotelephones over an entire ATC service area can be substantially synchronized. Additional benefit to GPS may be derived from system-wide synchronization of gating. The ATCs can instruct all active radiotelephones regarding the gating epoch. All ATCs can be mutually synchronized via GPS.

Multi-Band/Multi-Mode Satellite Radiotelephone Communications Systems and Methods Some embodiments of the present invention that were described above may use the same satellite radiotelephone link band and satellite feeder link band for space-based communications with radiotelephones in all satellite cells of the satellite footprint or service area. Moreover, some embodiments of the present invention that were described above may use the same satellite radio frequency band and substantially the same air interface for terrestrial communications with radiotelephones using an ancillary terrestrial network. Other embodiments of the present invention that will now be described may use more than one band and/or more than one air interface in various satellite cells in the satellite footprint or service area. In still other embodiments, although different bands and/or different air interfaces may be used in different satellite cells or within a satellite cell, the satellite radiotelephone frequency band and the air interface that is used for terrestrial communications between an ancillary terrestrial network and radiotelephones within a given satellite cell, is substantially the same as is used for space-based communications with the radiotelephones within the given satellite cell or in different satellite cells.

As used herein, "substantially the same" band means that the bands substantially overlap, but that there may be some areas of non-overlap, for example at the band ends. Moreover, "substantially the same" air interface means that the air interfaces are similar but need not be identical. Some changes may be made to the air interface to account for different characteristics for the terrestrial and satellite environments. For example, a different vocoder rate may be used (for example, 13 kbps for GSM and 4 kbps for satellite), a different forward error correction coding and/or a different interleaving depth may be used.

Multi-band/multi-mode satellite radiotelephone communications systems and methods according to some embodiments of the present invention may be used when a satellite footprint or service area spans a geographic area in which two or more terrestrial radiotelephone systems (wireless network operators) are present, to add spaced-based communications capability to two or more terrestrial networks. Within a geographic area that is covered by a given terrestrial radiotelephone system, embodiments of the invention can provide additional capacity and/or extended services using the space-based component and/or the ancillary terrestrial network, using substantially the same band and/or air interface as the terrestrial radiotelephone system. Thus, different geographic regions corresponding to different terrestrial radiotelephone communications systems and methods according to embodiments of the invention may use different bands and/or air interfaces for compatibility with the terrestrial radiotelephone systems that are located within the different geographic areas. There also may be other scenarios wherein it may be desired for a single satellite radiotelephone communications system/method to employ different bands and/or air interfaces over the same and/or different geographic regions thereof.

Figure 16:
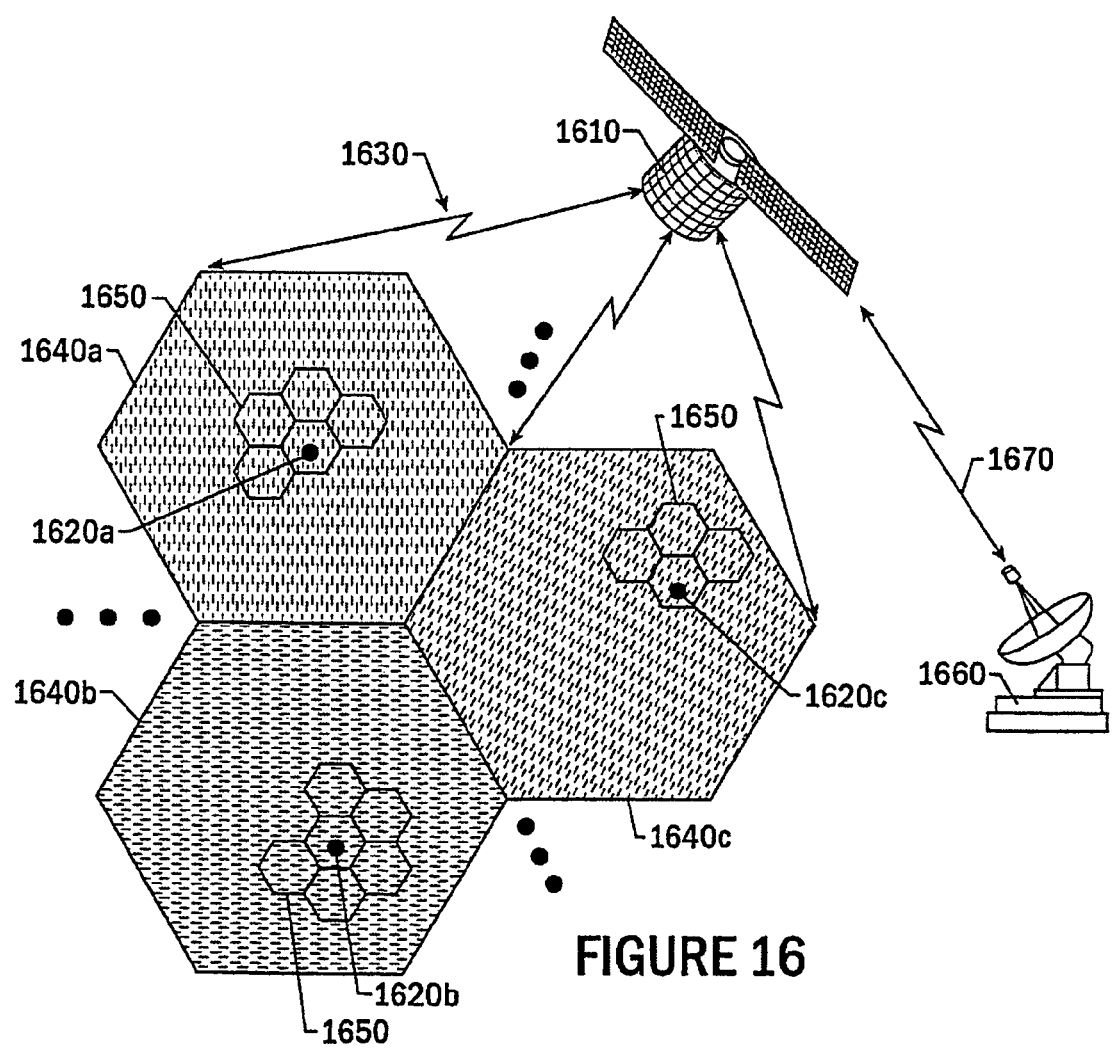
FIG. 16 is a schematic diagram of satellite radiotelephone systems and methods according to some embodiments of the invention.

FIG. 16 is a schematic diagram of satellite radiotelephone systems and methods according to some embodiments of the invention. As shown in FIG. 16, these embodiments of satellite radiotelephone systems and methods include a space-based component 1610 that is configured to communicate with radiotelephones 1620a–1620c in a satellite footprint 1630 that is divided into a plurality of satellite cells 1640a–1640c. It will be understood by those having skill in the art that, although three satellite cells 1640a–1640c and three radiotelephones 1620a–1620c are illustrated in FIG. 16, satellite radiotelephone systems and methods according to embodiments of the present invention may employ more than three satellite cells 1640a–1640c and may employ more than three radiotelephones 1620a–1620c.

Still referring to FIG. 16, the space-based component 1610 is configured to communicate with a first radiotelephone 1620a in a first satellite cell 1640a over a first frequency band and/or a first air interface, and to communicate with a second radiotelephone 1620b in a second satellite cell 1640b over a second frequency band and/or a second air interface. In other embodiments, the first radiotelephone 1620a and the second radiotelephone 1620b may be in the same satellite cell.

Still referring to FIG. 16, in some embodiments of the present invention, an ancillary terrestrial network 1650 is configured to communicate terrestrially with the first radiotelephone 1620a over substantially the first frequency band and/or substantially the first air interface, and to communicate terrestrially with the second radiotelephone 1620b over substantially the second frequency band and/or substantially the second air interface. These substantially the same first frequency band and/or first interface in the first satellite cell 1640a and in the portion of the ancillary terrestrial network 1650 therein, is illustrated by the vertical dashed lines that cover the first satellite cell 1640a and the portion of the ancillary terrestrial network 1650 therein. The substantially the same second frequency band and/or second air interface in satellite cell 1640b and in the portion of the ancillary terrestrial network 1650 therein, is illustrated by the horizontal dashed lines that cover the second satellite cell 1640b and the portion of the ancillary terrestrial network 1650 therein.

It will be understood that in FIG. 16, the ancillary terrestrial network 1650 is illustrated as including a small number of ancillary terrestrial network cells for simplicity. However, more ancillary terrestrial network cells may be present in some embodiments of the present invention. Moreover, it also will be understood that, in some embodiments, a first portion of the ancillary terrestrial network 1650 within satellite cell 1640a may be operated by a first wireless network operator and a second portion of the ancillary terrestrial network 1650 within the first satellite cell 1640a or within the second satellite cell 1640b may be operated by a second wireless network operator. Accordingly, some embodiments of the invention provide systems and methods for adding space-based communications to first and second terrestrial networks.

Referring again to FIG. 16, satellite radiotelephone systems and methods according to some embodiments of the present invention also include a gateway 1660 that is configured to communicate with the space-based component 1610 over a feeder link 1670. The feeder link 1670 is configured to transport communications between the space-based component 1610 and the first and second radiotelephones 1620a, 1620b. In some embodiments, the feeder link 1670 comprises the first air interface and the second air interface. Finally, it also will be understood that a third satellite cell 1640c, a third radiotelephone 1620c, and a substantially the same third frequency band and/or air interface is illustrated by oblique dashed lines in satellite cell 1640c. In other embodiments, the third radiotelephone 1620c is in the same cell as the first radiotelephone 1620a and/or the second radiotelephone 1620b.

Figure 17:
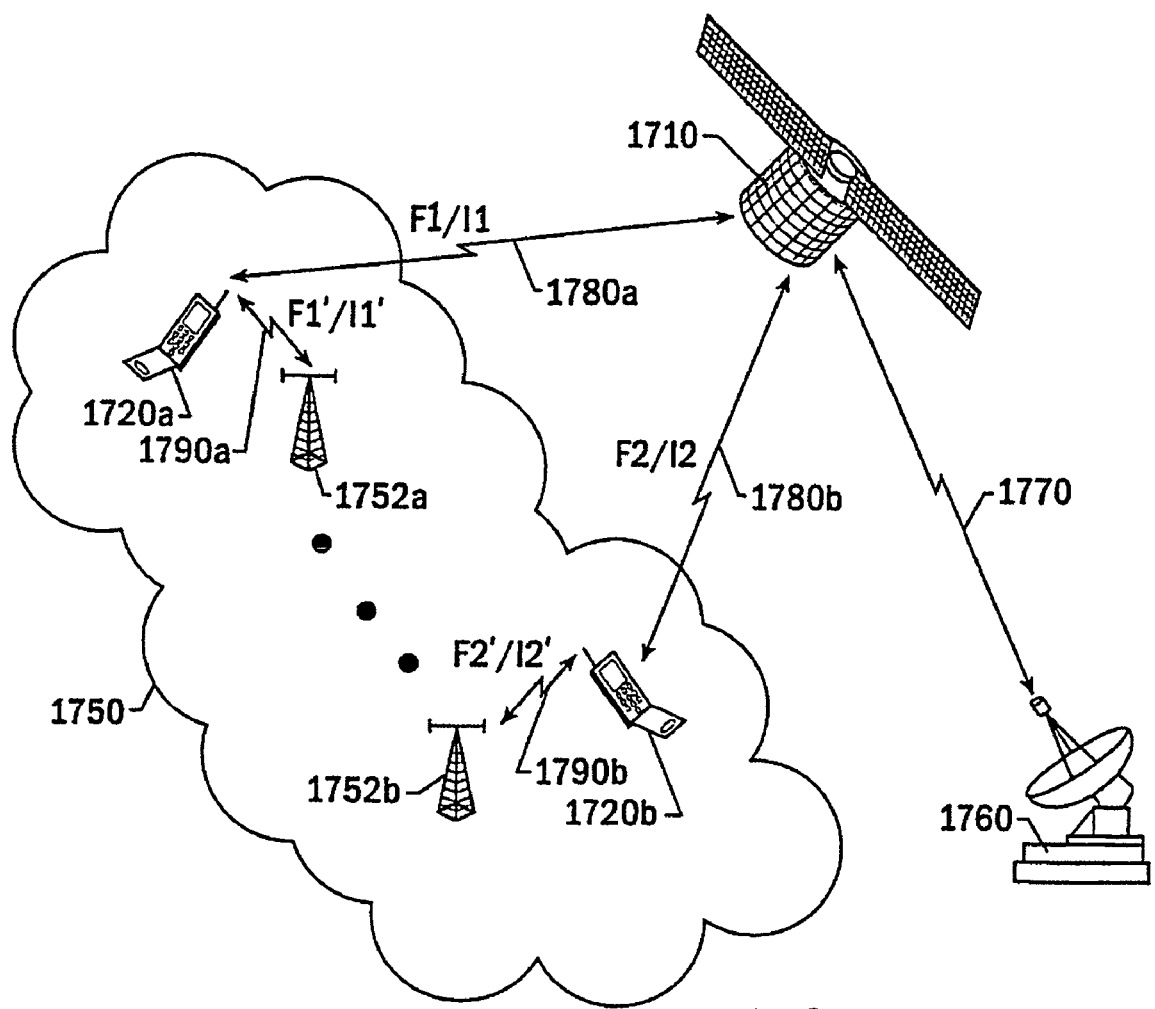
FIG. 17 is a schematic diagram of satellite radiotelephone systems and methods according to some embodiments of the invention.

FIG. 17 is a schematic diagram of satellite radiotelephone systems and methods according to other embodiments of the present invention. As shown in FIG. 17, a space-based component 1710 is configured to communicate with a first radiotelephone 1720a over a first frequency band and/or first air interface 1780a, also designated in FIG. 17 by F1/I1. As also shown in FIG. 17, the space-based component 1710 is also configured to communicate with a second radiotelephone 1720b over a second frequency band and/or a second air interface 1780b, also designated in FIG. 17 by F2/I2. An ancillary terrestrial network 1750 is configured to communicate terrestrially with the first radiotelephone 1720a over substantially the first frequency band and/or substantially the first air interface 1790a, also designated in FIG. 17 as F1'/I1', and to communicate terrestrially with the second radiotelephone 1720b over substantially the second frequency band and/or substantially the second air interface 1790b, also designated in FIG. 17 as F2'/I2'. The ancillary terrestrial network 1750 may be included within a single satellite cell or may spread across multiple satellite cells.

As also shown in FIG. 17, the ancillary terrestrial network can comprise a first ancillary terrestrial component 1752a that is configured to communicate terrestrially with the first radiotelephone 1720a over substantially the first frequency band and/or substantially the first air interface 1790a. A second ancillary terrestrial component 1752b is configured to communicate terrestrially with the second radiotelephone 1720b over substantially the second frequency band and/or substantially the second air interface 1790b. As was the case in FIG. 16, a large number of radiotelephones 1720 and/or ancillary terrestrial components 1752 may be provided in some embodiments. The first and second ancillary terrestrial components 1752a, 1752b, respectively, may be parts of two separate wireless networks in the same and/or different satellite cells, in some embodiments. Thus, some embodiments of FIG. 17 provide systems and methods for adding space-based communications to first and second terrestrial networks. A gateway 1760 and a feeder link 1770 may be provided, as was described in connection with FIG. 16.

Some embodiments of the present invention provide satellite radiotelephone systems and/or methods that include radiotelephone links that are operative over a plurality of bands. In some embodiments, the band-sensitive (i.e., frequency-sensitive) components of the space-based component 1610, 1710, such as the antenna feed network, the power amplifiers, the low noise amplifiers, etc., may be designed to be broadband, so that the operational range of the space-based component can extend over a plurality of service link bands, such as L-band, S-band, etc. In other embodiments, separate components for each band may be provided. In still other embodiments, some common broadband components and some separate narrowband components may be provided.

Moreover, other embodiments of the present invention may provide a multi-mode payload capacity, by providing a plurality of air interfaces that may be used to provide radiotelephone communications with the space-based component 1610, 1710 and a plurality of radiotelephones 1620, 1720 in a satellite footprint over the same and/or a plurality of satellite cells. The space-based component 1610, 1710 may be configured to support a plurality of air interface standards, for example by having a programmable channel increment that can be responsive to ground commands. Different channel increments, for example, may be applied by the space-based components 1620, 1720 to different bands of the received feeder link signal 1670, 1770 from a gateway 1660, 1760. These different bands of the feeder link spectrum may remain constant or may change with time, depending on the traffic carried by each air interface standard that may be supported by the satellite radiotelephone system.

Thus, in some embodiments, the feeder link 1670, 1770 may be segmented into bands, such as bands $B_1$, $B_2$ and $B_3$. In one example, band $B_1$ can transport GSM carriers between the gateway and the space-based component, band $B_2$ can transport narrowband CDMA carriers and band $B_3$ may transport wideband CDMA carriers. It will be understood by those having skill in the art that corresponding return feeder link bands may be provided for carriers from the space-based component 1610, 1710 to the gateway 1660, 1760. In other embodiments of the present invention, an ancillary terrestrial network 1650, 1750 also may be provided to communicate terrestrially with radiotelephones 1620, 1720 in the satellite footprint. Thus, in some embodiments, the ancillary terrestrial network 1650, 1750 may provide a larger portion of the radiotelephone communications in urban areas, whereas the space-based component 1610, 1710 may provide a larger portion of the radiotelephone communications in rural areas.

Figure 13:
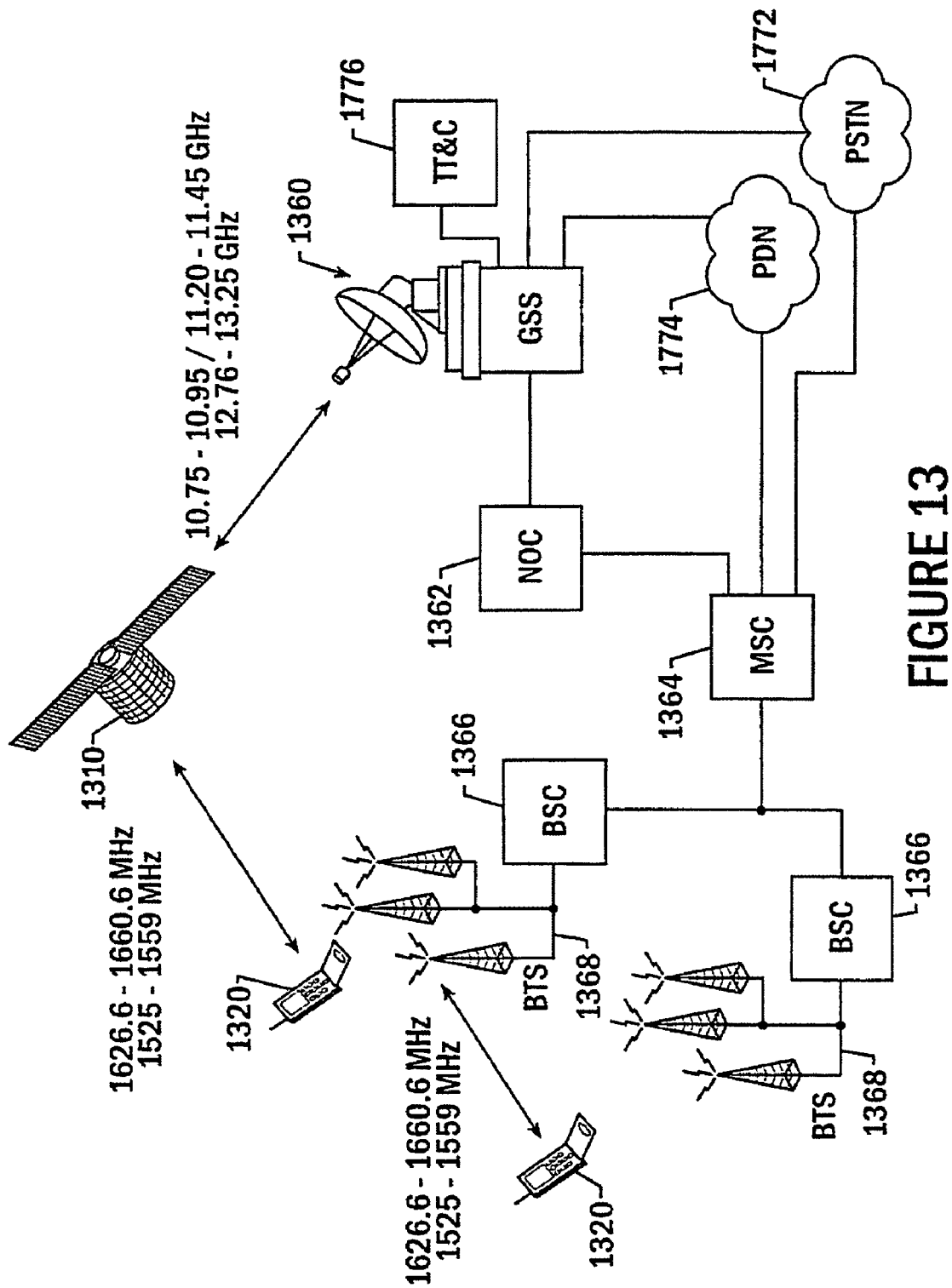
FIG. 13 is a block diagram of satellite radiotelephone systems and methods according to some embodiments of the invention.

FIG. 13 is a block diagram of satellite radiotelephone systems and/or methods that can use multiple bands and/or multiple modes according to some embodiments of the present invention. It will be understood by those having skill in the art that FIG. 13 relates to GSM, and system elements that provide a GSM air interface are shown. However, other satellite radiotelephone systems and/or methods also may be provided according to embodiments of the present invention.

In particular, as shown in FIG. 13, these embodiments of satellite radiotelephone communication systems and methods include a space-based component 1310, for example a geostationary satellite, and at least one Gateway Station System (GSS) 1360, Network Operation Center (NOC) 1362, Mobile Switching Center (MSC) 1364, Base Station Controller (BSC) 1366 and Base Transceiver Station (BTS) 1368. The satellite radiotelephone system may be connected to the Public Switched Telephone Network (PSTN) 1772 and/or to one or more Public Data Networks (PDN) 1774. In addition, to offer a General Packet Radio Service (GPRS), some MSCs 1364 may be augmented by appropriate packet switching facilities, generally referred to as Support GPRS Service Node (SGSN) and GPRS Gateway Support Node (GGSN). The GSS also may be connected to a Tracking Telemetry & Command (TT&C) system 1776. A plurality of radiotelephones 1320 also may be provided.

Figure 14:
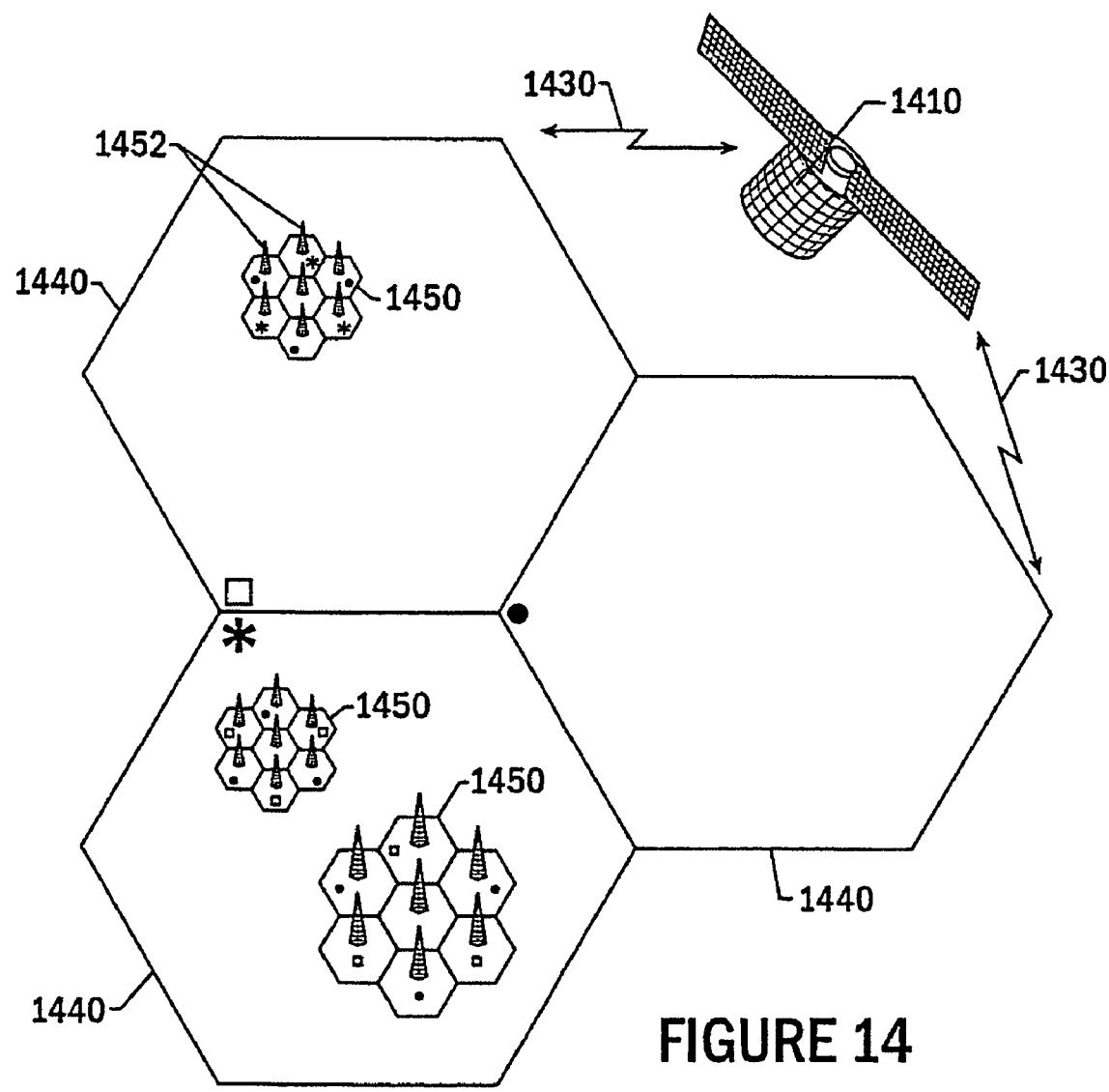
FIG. 14 is a schematic diagram of terrestrial frequency reuse of satellite frequencies according to some embodiments of the invention.

FIG. 14 illustrates frequency reuse between a space-based component and an ancillary terrestrial network according to some embodiments of the present invention. As shown in FIG. 14, relatively small ancillary terrestrial network cells 1450 are nested inside the relatively large satellite cells 1440. This may occur because, even with large reflectors that may be used in the space-based component 1410, the satellite cells 1440 may still be on the order of several hundred kilometers in diameter, whereas the ancillary terrestrial network cells 1450 may be two, three or more orders of magnitude smaller than the satellite cells. In FIG. 14, terrestrial reuse of the same carrier frequency is indicated by the same symbol (•, □ or ∗).

Embodiments of the present invention as shown in FIGS. 13 and 14 can allow a single satellite radiotelephone system to support a plurality of ancillary terrestrial components 1452 in an ancillary terrestrial network 1450, with at least some of the ancillary terrestrial components 1452 providing terrestrial connectivity via a different air interface. This may allow the relatively large satellite footprint 1430 to be used in a terrestrial market which is segmented. Thus, in some embodiments, the satellite radiotelephone system may be configured to support a GSM-based ancillary terrestrial component, a narrowband CDMA-based ancillary terrestrial component, and a wideband CDMA-based ancillary terrestrial component, at the same time and over the same or different satellite cells. In other embodiments, a subset of the ancillary terrestrial components may be operating at L-band, for example, while another subset of ancillary terrestrial components may be operating at S-band.

As was already described, in some embodiments, satellite radiotelephone communications systems and methods can provide substantially the same band/same air interface service for both space-based communications with the space-based component and terrestrial communications with at least one of its ancillary terrestrial components. This can allow simplified radiotelephones.

Figure 15:
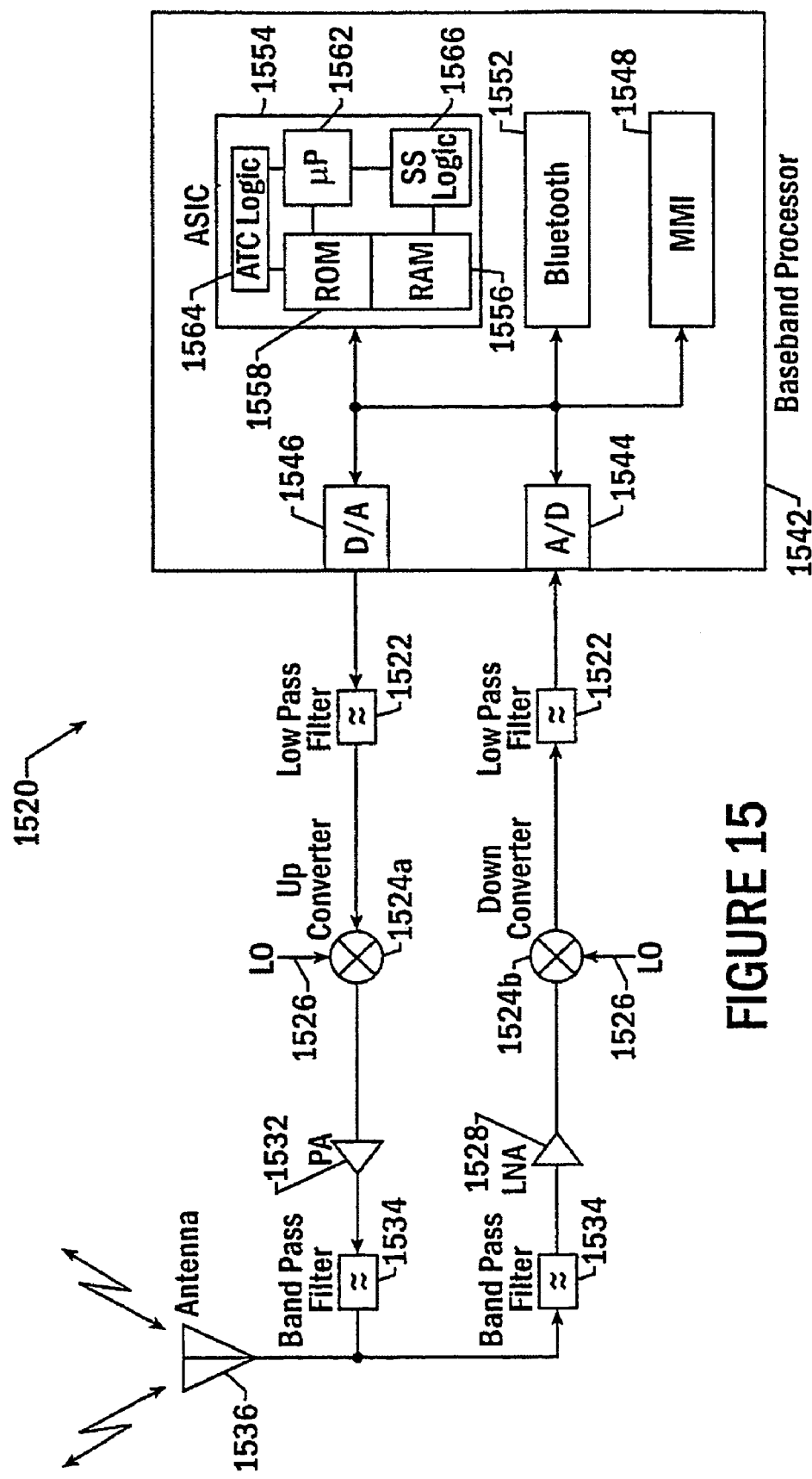
FIG. 15 is a block diagram of radiotelephones according to some embodiments of the invention.

In particular, FIG. 15 is a block diagram of radiotelephones 1520 that may be used to communicate with a space-based component and an ancillary terrestrial component in satellite radiotelephone systems or methods according to some embodiments of the present invention. In some embodiments, these radiotelephones 1520 can be used with satellite radiotelephone systems according to some embodiments of the present invention that include an ancillary terrestrial component and a space-based component that use substantially the same band and substantially the same air interface. The ability to reuse the same spectrum for space-based and terrestrial communications can facilitate low cost, small and/or lightweight radiotelephones, according to some embodiments of the present invention.

Moreover, some embodiments of the present invention can place more of the burden of link performance with the space-based component rather than the radiotelephone, compared to prior satellite radiotelephone systems, such as Iridium or Globalstar. Accordingly, large antennas may not need to be used in the radiotelephone. Rather, antennas that are similar to conventional cellular radiotelephone antennas may be used.

Accordingly, referring to FIG. 15, a single Radio Frequency (RF) chain including low pass filters 1522, up and down converters 1524a, 1524b, Local Oscillators (LO) 1526, Low Noise Amplifier (LNA) 1528, Power Amplifier (PA) 1532, bandpass filters 1534 and antenna 1536, may be used. A single baseband processor 1542 may be used, including an analog-to-digital converter (A/D) 1544, a digital-to-analog converter (D/A) 1546 and a Man-Machine Interface (MMI) 1548. An optional Bluetooth interface 1552 may be provided. An Application-Specific Integrated Circuit (ASIC) 1554 may include thereon Random Access Memory (RAM) 1556, Read-Only Memory (ROM) 1558, a microprocessor (µP) 1562, logic for ancillary terrestrial communications (ATC Logic) 1564 and logic for space-based communications (Space Segment Logic or SS Logic) 1566. The SS Logic 1566 can be used to accommodate satellite-unique requirements over and above those of cellular or PCS, such as a satellite-unique vocoder, a satellite forward error correction coding scheme, a satellite-unique interlever, etc. However, this added gate count may not increase the cost of the ASIC 1554.

According to other embodiments of the invention, the space-based component may be dimensioned appropriately, so that there is no need for radiotelephones to use large antennas 1536 or to have to radiate any more power when in satellite mode than when in terrestrial mode. An appropriate level of link robustness may be attained via the spot-beam gain that can be provided by a larger satellite antenna and/or other techniques. This can more than compensate for the several dB reduction in satellite link robustness that may occur when eliminating a large satellite antenna from the radiotelephone and/or using a single antenna for terrestrial and satellite communications. Accordingly, single mode and single band radiotelephones may be provided that can communicate with the space-based component and the ancillary terrestrial network over a single band and single air interface.

Aggregate Radiated Power Control for Multi-Band/Multi-Mode Satellite Radiotelephone Communications Systems and Methods Multi-band/multi-mode satellite radiotelephone communications systems and methods according to other embodiments of the present invention now will be described.

Figure 18:
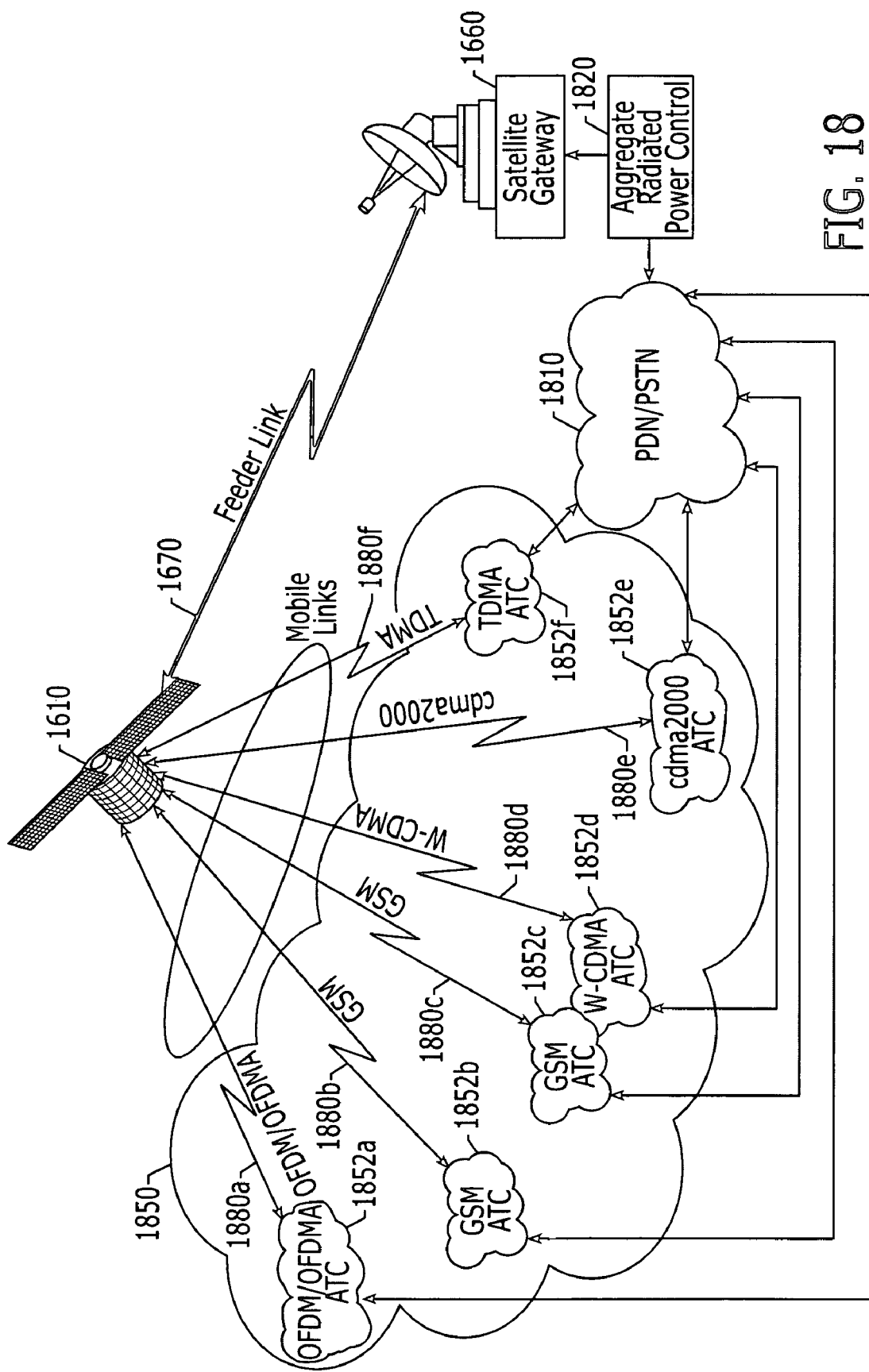
FIG. 18 is a schematic diagram of satellite radiotelephone systems and methods including aggregate radiated power control according to some embodiments of the present invention.

In particular, referring to FIG. 18, a satellite radiotelephone system includes a space-based component 1610 that is configured to communicate with a plurality of radiotelephones over a plurality of frequency bands and/or a plurality of air interfaces. The links that use the plurality of frequency bands and/or air interfaces are denoted in FIG. 18 as 1880a–1880f, although it will be understood that fewer or more frequency bands/air interfaces may be used. An ancillary terrestrial network (ATN) 1850 is configured to communicate terrestrially with the plurality of radiotelephones over substantially the plurality of frequency bands and/or substantially the plurality of air interfaces. It will be understood that, in FIG. 18, five ancillary terrestrial components (ATC) 1852a–1852f are shown, although fewer or more ancillary terrestrial components may be employed in the ancillary terrestrial network 1850. A satellite gateway 1660 and a PDN/PSTN 1810 are also provided as was already described.

Still referring to FIG. 18, an aggregate radiated power controller 1820 is provided that is configured to limit an aggregate radiated power by the plurality of radiotelephones to a maximum aggregate radiated power. In some embodiments, the aggregate radiated power controller is configured to control a plurality of co-frequency radiotelephones, so as to limit the aggregate radiated power by the plurality of co-frequency radiotelephones to a maximum aggregate radiated power. As used herein, "co-frequency" means that the radiotelephones use the same carrier frequency even if they use different TDMA time slots (different TDMA channels) or use different CDMA spreading codes (different CDMA channels). Accordingly, compliance with radiation requirements for the ancillary terrestrial network 1850 may be maintained even though the ancillary terrestrial network 1850 employs a plurality of frequency bands and/or air interfaces. It will be understood that the aggregate radiated power controller 1820 may be provided as a stand alone component, as part of the gateway 1660, and/or as part of another component of the satellite radiotelephone system and/or the ATN.

In some embodiments of the present invention, the aggregate radiated power controller 1820 is configured to allow control over substantially all of the ATN and/or substantially all of the radiotelephones that are communicating therewith. However, in other embodiments of the present invention, the aggregate radiated power controller 1820 is configured to limit an aggregated radiated power by a subset of the plurality of radiotelephones to a maximum aggregate radiated power. For example, in some embodiments, the plurality of frequency bands comprises a first frequency band and a second frequency band, and the subset of the plurality of radiotelephones comprises radiotelephones that communicate terrestrially with the ancillary terrestrial network over substantially the first frequency band. In some embodiments, the first frequency band comprises L-band frequencies and, in some embodiments, the second frequency band comprises S-band frequencies. In other embodiments, the first frequency band comprises L-band frequencies that are used substantially inter-radio-horizon by another system and the second frequency band comprises L-band frequencies that are not used substantially inter-radio-horizon by another system. In these embodiments, the second frequency band may further comprise S-band frequencies.

Thus, in some embodiments, only a first subset of the ATN, and/or the radiotelephones communicating therewith, may be subject to aggregate radiated power control, whereas a second subset of the ATN, and/or the radiotelephones that are communicating therewith, need not be subject to aggregate radiated power control. For example, L-band frequencies that are radiated terrestrially may potentially cause interference with another system, and may be subject to aggregate radiated power control. In contrast, S-band frequencies and L-band frequencies that are not used substantially inter-radio-horizon by another system may not potentially cause interference with another system, and therefore may not be subject to aggregate radiated power control, according to embodiments of the present invention.

More specifically, a Mobile Satellite System (MSS) including an ATN 1850 may provide voice and/or data services to end users over its footprint using more than one air interface protocol. It may be desirable for the system to be capable of providing services to end users via several air interface protocols given the current fragmentation and potential future uncertainty of the U.S. radiotelephone communications market. Currently, the U.S. market may be serviced by iDEN, GSM and cdma2000, but other emerging standards, such as W-CDMA and/or OFDM/OFDMA, may be used in the future. A system architecture that lends itself to the plurality of current standards (air interface protocols) and can also accommodate future (currently anticipated or not) technologies can offer increased flexibility.

FIG. 18 illustrates a potential deployment scenario for the ATN. As shown, different and/or overlapping geographical areas may be served by ATCs 1852a–1852f that are using different air interface protocols. The satellite 1610 is capable of transporting the plurality of protocols to/from the satellite gateway 1660 where different sets of transceiver units may be associated with the processing of the different air interface waveforms. The radiotelephone may contain an integrated transceiver capable of communicating via the satellite 1610 or via at least one ATC 1852, and potentially over other PCS/cellular bands, depending, for example, on business relationships that may be established with other wireless operators. The satellite/ATN part of the radiotelephone transceiver may utilize substantially the same air interface protocol to communicate via the satellite 1610 or via at least one ATC 1852. This approach can reduce or minimize the size, weight and/or manufacturing cost of the transceiver by increasing the level of integration and reuse of hardware and software for both satellite and ATN modes.

In some embodiments of the invention, the ATN may be based on a CDMA air interface protocol without producing any greater interference potential than the Federal Communications Commission rules allow for a GSM-based ATN. See, Report and Order and Notice of Proposed Rulemaking, FCC 03-15, *Flexibility for Delivery of Communications by*

Mobile Satellite Service Providers in the 2 GHz Band, the L-Band, and the 1.6/2.4 Bands, IB Docket No. 01-185, Adopted: Jan. 29, 2003, Released: Feb. 10, 2003, hereinafter referred to as "FCC 03-15". Thus, the technology used by the ATN or any of its ATCs can be irrelevant as long as the aggregate co-frequency emissions level is controlled so as not to exceed the limit set forth by the Commission for the specific GSM system considered in FCC 03-15. As such, an ATN 1850 can be developed to function with a plurality of air interface protocols simultaneously, as long as it adheres to the aggregate radiated power spectral density limit set forth by the Commission (i.e., −53+10log(1,725) dBW/Hz).

In FCC 03-15, the Commission allowed 1,725-fold terrestrial reuse, by the US ATN, of a GSM carrier that is also used by the MSS for satellite communications. A single fully-loaded GSM carrier on an ATC return link, which is being radiated from several radiotelephones (up to eight) to a base station, may launch a maximum −53 dBW/Hz of power spectral density into space. The maximum aggregate power spectral density that may be launched into space from 1,725 co-channel fully loaded return-link GSM carriers is, therefore, −53+10log (1725)≈−20.64 dBW/Hz. This is based on a GSM radiotelephone peak EIRP of 0 dBW, consistent with the analysis of FCC 03-15. It is this maximum aggregate power spectral density, produced on the return link by the maximum allowed US-wide frequency reuse of the ATN, that the Commission has concluded may potentially raise the noise floor of Inmarsat's satellite receivers by as much as 0.7%.

The maximum EIRP of a CDMA return link code (user) may be −10 dBW and may be transmitted over a carrier occupying a bandwidth of 1.25 MHz in accordance, for example, with the cdma2000 air interface standard. Thus, −10−10log(1,250,000)≈−70.97 dBW/Hz of power spectral density may be launched into space by a single CDMA code (user) operating on an ATC return link. The allowed −20.64 dBW/Hz maximum aggregate power spectral density limit, as derived above, may therefore accommodate approximately $10^{[(70.97-20.64)/10]} \approx 107{,}894$ co-channel return link CDMA codes. This result may be used to establish an equivalence relation, for the ATN return link, between a pure GSM ATN and a pure CDMA ATN.

Thus, from an aggregate return link interference power spectral density standpoint, 1,725-fold US-wide frequency reuse of a GSM carrier by the ATN may be considered equivalent to approximately 107,894 codes (users) transmitting US-wide on a given 1.25 MHz CDMA carrier. The number of users is generally less than or equal to the number of codes, because a user may be allocated more than one code to improve the reliability and/or data rate of transmission. The stated equivalence is based on GSM's peak return link EIRP assumed to be 0 dBW while that of a CDMA code is assumed to be −10 dBW.

A mathematical equivalence may be established between a single active (transmitting) GSM time slot (user) transmitting at a peak EIRP of 0 dBW, and a number of CDMA codes (users) being active and each transmitting at a peak EIRP of −10 dBW. This relationship can allow deploying an ATN that contains both GSM and CDMA technologies, and potentially fluctuating capacity between the two, and is, from the point of view of aggregate return link interference power spectral density potential, equivalent to the pure GSM system that the Commission addressed in FCC 03-15.

In particular, according to FCC 03-15, there are 1,725× 8=13,800 GSM time slots (users) that can be active on the ATN (US-wide) on a given GSM carrier while maintaining the potential for noise increase to Inmarsat's satellite receivers at 0.7%. It was shown above that, from an aggregate up-link power spectral density interference potential standpoint, this is equivalent to approximately 107,894 codes (users) transmitting on a given 1.25 MHz CDMA carrier (US-wide). Thus, one active co-frequency GSM slot (user) equates to approximately 107,894/13,800≈7.8184 active co-frequency CDMA codes (users). Thus, an equation that may be used to govern co-frequency ATN operations over the United States may be:

$$N_{GSM} + 13{,}800 N_{CDMA}/107{,}894 = 13{,}800. \qquad (1)$$

In Equation (1), NGSM denotes the number of active co-frequency GSM time slots (users) while $N_{CDMA}$ denotes the number of active co-frequency CDMA codes (users). In some embodiments, the $N_{GSM}$ GSM time slots are at least partially co-frequency with the $N_{CDMA}$ CDMA codes. Since there are 6 distinct GSM carriers that can be co-frequency with a single CDMA carrier of 1.25 MHz bandwidth, the co-frequency CDMA carrier loading will deplete, by the same amount of $13{,}800 N_{CDMA}/107{,}894$, the US-wide capacity of all 6 corresponding (co-frequency with the CDMA carrier) GSM carriers. Based on the above, it is seen that a US-wide ATN network that is configured to support simultaneously both GSM and cdma2000 traffic can be compliant with the Commission's uplink interference constraint (no more than 0.7% ΔT/T impact to, for example, Inmarsat) if and only if Equation (1) is substantially satisfied. The MSS/ATN operator may comply by apportioning the total co-frequency traffic in such an ATN substantially in accordance with Equation (1).

As discussed earlier, a fully-loaded GSM return link carrier (all eight time slots occupied) may generate −53 dBW/Hz of maximum EIRP density potential. This result is based on GSM radiotelephones/radioterminals having an antenna gain of, for example, 0 dBi and radiating a maximum 0 dBW EIRP over a carrier bandwidth of 200 kHz (in accordance with the FCC's assumptions in FCC 03-15.

A cdma2000 ATN radioterminal having, for example, a 0 dBi antenna gain may be limited (by design) to a maximum of, for example, −9 dBW EIRP while communicating using a single code. Given the 1.25 MHz carrier bandwidth of cdma2000 (1×RTT) the maximum EIRP density that may be generated by a single cdma2000 return-link code may be $-9-10\log(1.25 \times 10^6) \approx -70$ dBW/Hz. It therefore follows that $10^{[(70-53)/10]} \approx 50$ co-frequency cdma2000 codes may generate the same uplink interference power spectral density potential as one fully-loaded GSM carrier.

For W-CDMA, an ATN radioterminal having, for example, a 0 dBi antenna gain may be limited (by design) to a maximum of, for example, −9 dBW EIRP while communicating using a single code. Given the 5 MHz carrier bandwidth of W-CDMA, such a radioterminal may generate an EIRP density potential of $-9-10\log(5\times 10^6) \approx -76$ dBW/Hz. Thus, $10^{[(76-53)/10]} \approx 200$ co-frequency W-CDMA codes may generate the same uplink interference power spectral density potential as one fully-loaded GSM carrier.

For an ATN that may be based on all three technologies (GSM, cdma2000, and W-CDMA) the following constraint equation may be used to specify the allowed distribution of on-the-air co-frequency traffic associated with the three standards:

$$N/8 + M/50 + L/200 = R \qquad (2)$$

where N denotes the number of GSM time slots (channels) supported ATN-wide co-frequency by a given GSM carrier as that carrier is used and reused, M represents the number of cdma2000 co-frequency codes (channels) supported by a single cdma2000 carrier as that carrier is used and reused throughout the ATN, L identifies the number of W-CDMA co-frequency codes (channels) on a single W-CDMA carrier as that carrier is used and reused by the ATN, and R denotes the pure GSM-based ATN frequency reuse authorized by the FCC. In some embodiments, the N GSM time slots, the M cdma2000 codes and the L W-CDMA codes are at least partially co-frequency. Note that the above equation can provide a constraint that may be imposed on co-frequency operating carriers (all three carrier types, GSM, cdma2000, and W-CDMA, whose ATN-wide traffic is apportioned in accordance with the above equation may be operating co-frequency). Furthermore, for a pure GSM-based ATN deployment, the above equation reduces to N=8R (M=L=0) which confirms that the total number of time slots (channels) that can be supported by a single GSM carrier ATN-wide equals eight times the authorized frequency reuse.

Since there are 6 GSM carriers that may fit within the bandwidth occupied by a single cdma2000 carrier, the nationwide loading (M) of a cdma2000 carrier may deplete, by the same amount of M/50, the nationwide capacity of all 6 corresponding (co-frequency with the cdma2000 carrier) GSM carriers. Similarly, since there are 25 GSM carriers that may exist within the bandwidth occupied by a single W-CDMA carrier, the nationwide loading (L) of a W-CDMA carrier may deplete, by the same amount of L/200, the nationwide capacity of all 25 corresponding (co-frequency with the W-CDMA carrier) GSM carriers. For similar reasons, since there are 4 cdma2000 carriers that may be accommodated (co-frequency) over the band of frequencies occupied by a W-CDMA carrier, the nationwide loading of a W-CDMA carrier may deplete, by the same amount of L/4, the nationwide capacity of all 4 corresponding (co-frequency with the W-CDMA carrier) cdma2000 carriers.

Equations (1) and (2) may be generalized as follows:

$$\sum_{i=1}^{x} \frac{N_i}{F_i} = MARP, \qquad (3)$$

where $N_i$ is the number of co-frequency active users using a given frequency band and/or air interface i;

$F_i$ is a corresponding equivalence factor (which may be less than, greater than or equal to 1) for the given frequency band/air interface i; and MARP is a measure of the maximum aggregate radiated power spectral density that is permitted.

It will be understood that in FCC 03-15, the aggregate radiated Power Spectral Density (PSD) that may be launched U.S.-wide by radioterminals communicating with an ATN may not exceed $-53+10\log(1725) \approx -20.6$ dBW/Hz. In arriving at this conclusion the FCC assumed that the ATN will be based on GSM technology and that the GSM radioterminals will be capable of launching in the direction of a co-frequency satellite system (e.g., Inmarsat) a maximum (uplink) EIRP of 0 dBW per carrier. The FCC's conclusion is also based on the assumption that only 50% of the ATN is inside the U.S.

The aggregate radiated U.S.-wide PSD may be higher if more than 50% of the ATN is allowed to be inside the U.S. For example, based on 80% deployment of the total ATN inside the US, the aggregate allowed US-wide PSD potential may grow to $-53+10\log(2760) \approx -18.6$ dBW/Hz. In FCC 03-15, the Commission concluded that the aggregate average signal attenuation that is relevant to uplink interference is 242.7 dB. This number takes into account attenuation/suppression of the interfering signal(s) due to (a) free-space propagation (188.7 dB), (b) co-frequency system satellite antenna discrimination in the direction of the ATN (25 dB), (c) outdoor blockage (3.1 dB), (d) closed-loop power control implemented by the ATN (20 dB), (e) use of a lower-rate vocoder (3.5 dB), (f) voice activity (1 dB), and (g) polarization discrimination provided by the co-frequency satellite system (1.4 dB). (See FCC 03-15, Appendix C2, Table 2.1.1.C, page 206). The interference signal suppression due to power control (20 dB) comprises 2 dB due to "range taper" and 18 dB due to structural attenuation. Based on the Commission's conclusions/assumptions, as specified in FCC 03-15, and assuming deployment of up to 80% of the ATN inside the US, the aggregate average PSD potential at the input of a co-frequency satellite antenna may be limited to $-18.6-242.7=-261.3$ dBW/Hz.

As was described above, aggregated radiated power controlling systems and methods according to some embodiments of the present invention, may be configured to limit an aggregate radiated power by a plurality of radiotelephones to a maximum aggregate radiated power. In embodiments that were described above, it was assumed that the ATN has the same amount of structural attenuation margin and/or return link margin across all ancillary terrestrial components thereof, that use a given frequency band and/or carrier frequency and/or air interface. The calculations that were described above were made under this assumption. However, this may not always be the case. Rather, according to other embodiments of the present invention, various ATCs in the ATN may provide different structural attenuation and/or return link margins. In fact, according to other embodiments of the present invention, link margins may be increased in various ATCs, to allow larger numbers of radioterminals to communicate terrestrially without exceeding a maximum aggregate radiated power. Two illustrative examples will be provided. In a first example, a plurality of cdma2000 radioterminals communicate with ATN infrastructure that provides 18 dB of structural attenuation margin. In a second example, not all of the ATN infrastructure provides 18 dB of structural attenuation margin.

Thus, in the first example, all cdma2000 ATC radioterminals communicate with infrastructure that provides 18 dB of structural attenuation margin. Relative to a satellite, a cdma2000 ATN radioterminal may radiate, for example, a maximum (spatially averaged) EIRP of $-13$ dBW per communications channel (i.e., per code; the EIRP consumed by the pilot channel is neglected for the sake of simplicity). Hence, the radioterminal's PSD potential, per communications channel, may be $-74$ dBW/Hz (at the radioterminal's antenna output) and $-74-242.7=-316.7$ dBW/Hz at the satellite's antenna input. The number of such radioterminals (communications channels) that operate co-frequency in order to generate the allowed PSD potential of $-261.3$ dBW/Hz, at the input of a satellite antenna, is $10^{[(316.7-261.3)/10]}=346,736$. In some embodiments, up to seven (7) cdma2000 carriers may be deployed in the ATN. Thus, the total on-the-air capacity of a U.S.-based ATN may be $346,736 \times 7 = 2,427,152$ simultaneous communications channels.

In the second example, not all radioterminals are communicating with infrastructure that provides 18 dB of structural attenuation margin. For example, let X, Y, and Z denote US-wide potential percentages (%) of ATN cdma2000 radioterminals that may be communicating co-frequency with ATN infrastructure that is providing A, B, and C dB, respectively, of structural attenuation margin. Thus:

$$X+Y+Z=100. \tag{4}$$

Letting L, M, and N denote the number of potential radioterminals that may be communicating with class A, B, and C infrastructure, respectively, we may write:

$$X=100L/(L+M+N),\ Y=100M/(L+M+N),\ Z=100N/(L+M+N). \tag{5}$$

Subject to the three classes/categories of ATN infrastructure (as defined above) that may be serving the ATN radioterminals, the aggregate power spectral density potential (in Watts/Hz) at a satellite antenna input may be:

$$psd=[L\xi+M\zeta+N\varsigma]/\sigma^2 \text{ Watts/Hz}. \tag{6}$$

In Equation (6), the quantity $10\log(\sigma^2)$ may, for example, be specified as $-74$ dBW/Hz, and $\xi$, $\zeta$, and $\varsigma$, may denote average aggregate (power-domain) attenuation factors associated with the three classes of radioterminals that may be served by the three classes of infrastructure, respectively. Thus, we may write:

$$10\log(\xi)=-(188.7+25+3.1+(A+2)+3.5+1+1.4)=-(224.7+A)\text{dB} \tag{7}$$

$$10\log(\zeta)=-(188.7+25+3.1+(B+2)+3.5+1+1.4)=-(224.7+B)\text{dB; and} \tag{8}$$

$$10\log(\varsigma)=-(188.7+25+3.1+(C+2)+3.5+1+1.4)=-(224.7+C)\text{dB}. \tag{9}$$

Using Equation (5):

$$N=L[(100-X)(100-Y)-XY]/100X,\text{ and } M=100YL/[(100-Y)(100-Z)-YZ]. \tag{10}$$

Substituting Equations (7) through (10) into Equation (6) and taking the logarithm, the average PSD potential at a victim satellite may be expressed as:

$$PSD=10\log(psd)=10\log(\sigma^2)+10\log(L)+10\log(10^{-(22.47+0.1A)}+10^{-(22.47+0.1B)}\times 100Y/[(100-Y)(100-Z)-YZ]+10^{-(22.47+0.1C)}\times[(100-X)(100-Y)-XY]/100X) \tag{11}$$

or, $$-261.3=-74+10\log(L)+10\log(10^{-(22.47+0.1A)}+10^{-(22.47+0.1B)}\times 100Y/[(100-Y)(100-Z)-YZ]+10^{-(22.47+0.1C)}\times[(100-X)(100-Y)-XY]/100X). \tag{12}$$

Solving for L:

$$L=10^{-18.73-\log(\ )} \tag{13}$$

In Equation 13, the second term of the exponent "log( )" is defined by Equation (12). That is:

$$\log(\ )=\log(10^{-(22.47+0.1A)}+10^{-(22.47+0.1B)}\times 100Y/[(100-Y)(100-Z)-YZ]+10^{-(22.47+0.1C)}\times[(100-X)(100-Y)-XY]/100X). \tag{14}$$

Once L is found from Equation (13), N and M may be evaluated using Equations (5) as follows:

$$N=L[(100-X)(100-Y)-XY]/100X,\text{ and } M=Y(L+N)/(100-Y) \tag{15}$$

The following Table provides illustrative numerical results:

TABLE

| X(%)/A(dB) | Y(%)/B(dB) | Z(%)/C(dB) | L | M | N | L + M + N | (L + M + N) × 7 |
|---|---|---|---|---|---|---|---|
| 100/18 | 0/18 | 0/18 | 346,736 | 0 | 0 | 346,736 | 2,427,152 |
| 60/22 | 30/12 | 10/6 | 68,859 | 34,439 | 11,499 | 114,797 | 803,579 |
| 30/18 | 60/12 | 10/6 | 24,349 | 48,685 | 8,108 | 81,142 | 567,994 |

Accordingly, the second example that was described above may provide additional embodiments of Equation (3), wherein $N_i$ denotes a number of co-frequency channels that are operative subject to a common ($i^{th}$) structural attenuation margin for a given frequency band and/or carrier frequency and/or air interface, $F_i$ denotes a corresponding equivalence factor, which may be less than, greater than, or equal to 1, for the common ($i^{th}$) structural attenuation margin for the given frequency band/carrier frequency/air interface, and MARP is a measure of the maximum aggregated radiated power, i.e., the maximum aggregate radiated Power Spectral Density (PSD).

In some embodiments of the invention, an ATN may be configured to maintain a list of infrastructure components (i.e., base stations and/or base station groupings), and associate with each infrastructure component a measure of Structural Attenuation Margin (SAM). Based on the registration procedure of radioterminals, and/or other means, the ATN may also be configured to have knowledge of the infrastructure component with which each active (on-the-air) radioterminal is communicating. Thus, the ATN may be configured to associate a SAM with each active radioterminal and may thus be configured to evaluate the quantity $\Sigma_i(psd)_i$, where psd denotes a power spectral density at a satellite and where the summation may be performed over an ensemble of active (on-the-air) radioterminals that are operating co-frequency in the ATN (i.e., are sharing in whole or in part an ATN band and/or sub-band of frequencies). In some embodiments of the invention, the quantity $(psd)_i$ may be evaluated for the $i^{th}$ co-frequency radioterminal as:

$$(psd)_i=10^{[\log(p_i/BW_i)+\log(\alpha_i)]}, \tag{16}$$

where the quantity $10\log(p_i)$ may denote a measure of the maximum EIRP in the direction of a satellite that may be generated by the $i^{th}$ active (on-the-air) radioterminal (e.g., $-4$ dBW for GSM, $-13$ dBW for cdma2000 and/or W-CDMA), $BW_i$ may denote a measure of the bandwidth occupied by the carrier being radiated by the $i^{th}$ active radioterminal (e.g., 200 kHz for GSM, 1.25 MHz for cdma2000, and 5 MHz for W-CDMA), and $10\log(\alpha_i)$ may denote a measure of aggregate signal attenuation that may exist between the $i^{th}$ radioterminal and a satellite.

The quantity $10\log(\alpha_i)$ may further be expressed as $10\log(\alpha_i)=-(L+SAM_i)$ dB, where L is defined as a measure of aggregate signal attenuation potential comprising, for example, (a) free-space propagation (i.e., 188.7 dB), (b) co-frequency satellite antenna discrimination (i.e., 25 dB), (c) outdoor blockage (i.e., 3.1 dB), (d) ATN power control due to range taper (i.e., 2 dB), (e) effect of low-rate vocoder (i.e., 3.5 dB), (f) effect of voice activity (i.e., 1 dB), and (g) polarization discrimination provided by co-frequency satellite antenna (i.e., 1.4 dB). (See FCC 03-15 Appendix C2, Table 2.1.1.C; page 206). $SAM_i$ may denote a measure of structural attenuation margin provided by the infrastructure component (i.e., a base station and/or a group of base stations) with which the $i^{th}$ active co-frequency radioterminal is communicating. Typical values of $SAM_i$ may be, for example, 22 dB, 18 dB, 12 dB, and 6 dB, for dense-urban, urban, sub-urban, and rural infrastructure components, respectively.

Accordingly, in some embodiments of the present invention, the aggregate radiated power controller is configured to control a plurality of co-frequency radioterminals, so as to limit the aggregate radiated power by the plurality of radioterminals to a maximum aggregate radiated power according to:

$$\sum_{i=1}^{x} (psd)_i = MARP, \quad (17)$$

where $(psd)_i$ is a measure of radiated power spectral density at a satellite and MARP is a measure of allowed maximum aggregate radiated power. In some embodiments, psd is determined according to $(psd)_i = 10^{[log(p_i/BW_i) + log(\alpha_i)]}$; where $10log(p_i)$ denotes a measure of maximum radiated power by the $i^{th}$ radioterminal in a direction of a satellite, $BW_i$ denotes a bandwidth occupied by a carrier that is radiated by the $i^{th}$ radioterminal and $10log(\alpha_i)$ denotes a measure of signal attenuation (in dB) between the $i^{th}$ radioterminal and the satellite.

The ATN may evaluate the quantity $\Sigma_i(psd)_i$, and/or another measure thereof, as needed, and may, in response to the value of $\Sigma_i(psd)_i$, and/or the value of the other measure, approaching, being equal to, or having exceeded a threshold value, control the ancillary terrestrial network and/or one or more of the radioterminals to limit the aggregate radiated power to a maximum aggregate radiated power.

Many techniques may be used to limit the aggregate radiated power. For example, in some embodiments, one or more co-frequency radioterminals may be commanded to 1) utilize a lower-rate vocoder, and/or 2) to reduce the rate of information transmission, and/or 3) to use other available ATN or non-ATN resources that may not be co-frequency with the resources that are relevant to the quantity $\Sigma_i(psd)_i$ (i.e., a frequency that has not exceeded the maximum aggregate radiated power) and/or another measure thereof. Thus, in some embodiments, the aggregate radiated power controller is configured to control the plurality of radioterminals by reducing a vocoder rate of at least one of the radioterminals, and/or reducing a rate of information transmission of at least one of the radioterminals, and/or controlling at least one of the radioterminals to communicate using a frequency that has not exceeded the maximum aggregate radiated power, so as to limit an aggregate radiated power by the plurality of co-frequency radiotelephones to the maximum aggregate radiated power.

Many different techniques also may be used to determine which radioterminal and/or which portion of the ancillary terrestrial network to control to reduce the aggregate radiated power, according to various embodiments of the present invention. Thus, in some embodiments, at least one radioterminal is selected and controlled as described above, so as to reduce the aggregate radiated power. In other embodiments, at least one radioterminal that is subject to a low, and in some embodiments a lowest, structural attenuation margin and which is, therefore, radiating at a relatively high level, may be controlled according to any of the embodiments described above.

Moreover, in other embodiments, a radioterminal may be selected based on the frequency band and/or carrier frequency and/or air interface that it is using, so that if a given frequency band and/or carrier frequency and/or air interface exceeds a desired maximum aggregate radiated power, one or more radioterminals that is/are using that frequency band and/or carrier frequency and/or air interface may be controlled. Accordingly, in some embodiments, the aggregate radiated power controller is configured to control a plurality of radioterminals, by controlling at least one radioterminal that is communicating with the ATN over a frequency band and/or carrier frequency and/or air interface that has exceeded a maximum aggregated radiated power for that frequency band and/or carrier frequency and/or air interface, so as to limit the aggregate radiated power by the plurality of radioterminals for the frequency band and/or carrier frequency and/or air interface to a maximum aggregate radiated power for the frequency band and/or carrier frequency and/or air interface. A priori radiated power quotas for a given frequency band and/or carrier frequency and/or air interface thereby may be observed.

In yet other embodiments of the invention, the aggregate radiated power controller is configured to control the ancillary terrestrial network itself, i.e., the terrestrial infrastructure, to thereby reduce the radiated power by at least one radioterminal. In particular, in some embodiments, the aggregate radiated power controller is configured to diversity combine signals that are received from at least one radioterminal by at least two ancillary terrestrial components and/or by an ancillary terrestrial component and at least one auxiliary antenna system, to thereby reduce the radiated power by the at least one radioterminal. The link margin and/or structural attenuation margin of ATN infrastructure components may thereby be increased.

More specifically, according to the Commission's analysis of the interference potential to co-channel satellite systems by the ATN, the structural attenuation margin provided by an ATN infrastructure component on the return link(s) may be increased or maximized. Increasing or maximizing this parameter may have a direct impact on the frequency reuse and/or the number of co-frequency communications channels allowed by the ATN. For a given maximum EIRP of an ATN radioterminal, the margin available by an infrastructure component on a return link may be increased according to some embodiments of the invention, by increasing the number of receive antenna elements on the ATN tower(s) of the infrastructure component and/or by configuring at least some of the receive antenna elements to operate on multiple spatially-orthogonal dimensions. This approach may yield an infrastructure component able to provide $\Phi$ dB of structural attenuation margin on forward links and $\Psi$ dB of structural attenuation margin on return links, where $\Psi \geq \Phi$. In the limit as $\Psi \to \infty$, the radioterminal EIRP approaches zero and so does the interference potential to a co-frequency satellite receiver. As such, the frequency reuse and/or the number of co-frequency communications channels allowed by the ATN may be increased.

Figure 19:
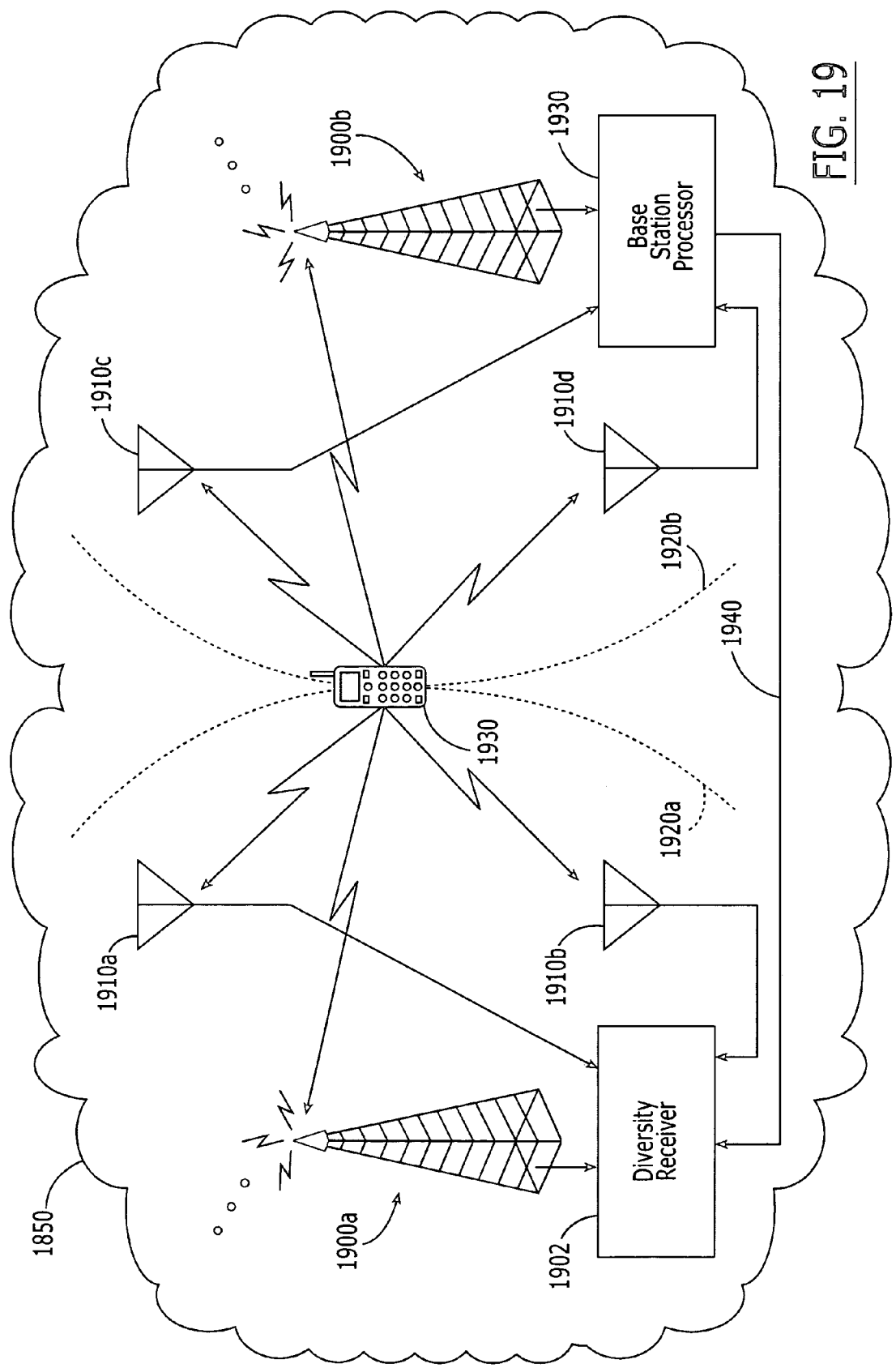
FIG. 19 is a schematic diagram of an ancillary terrestrial network including systems and methods that can increase link margins according to some embodiments of the present invention.

FIG. 19 is a schematic diagram of systems and methods according to embodiments of the present invention, wherein the aggregate radiated power controller of FIG. 18 is configured to control an ancillary terrestrial network of FIG. 19 to diversity combine signals that are received from at least one radioterminal by at least two ancillary terrestrial components and/or by an ancillary terrestrial component and at least one auxiliary antenna system, to thereby reduce the radiated power by the at least one radioterminal. Moreover, according to other embodiments of the present invention, embodiments of FIG. 19 may be used to increase link margin in a satellite radioterminal system that includes an ATN, independent of an aggregate radiated power controller.

Referring now to FIG. 19, an ancillary terrestrial network 1850 includes a plurality of ancillary terrestrial components, shown in FIG. 19 as first and second ancillary terrestrial components 1900a, 1900b, each of which communicates with at least one radioterminal 1930 over an area that defines a respective cell 1920a, 1920b.

Still referring to FIG. 19, a tower of the first ATC 1900a is configured with one or more transmit antennas and/or one or more receive antennas. As stated earlier, at least some elements comprising the transmitter and/or receiver antenna(s) of the infrastructure component may be operative in more than one spatial dimension. Moreover, a tower of the second ATC 1900b may be configured with one or more transmit antennas and/or one or more receive antennas with at least some of the antenna elements thereof operative in more than one spatial dimension. The first ATC 1900a and the second ATC 1900b comprising the illustrative infrastructure component of FIG. 19, may be adjacent ATCs. Each ATC of an ensemble of ATCs that may comprise an infrastructure component may have an associated cell 1920a, 1920b, that defines a cell edge inside of which the ATC is configured to serve at least one radioterminal 1930. A radioterminal that may be proximate to the cell boundaries/edges of at least two adjacent ATCs, as illustrated in FIG. 19, may be served concurrently by at least two adjacent ATCs 1900a, 1900b.

Accordingly, an infrastructure component comprising at least two adjacent ATCs, as illustrated in FIG. 19, may be configured to utilize one or more antenna elements per ATC to receive and process the transmissions of the radioterminal, which can increase return link robustness and/or available return link margin. For example, as shown in FIG. 19, a base station processor 1930 of the second base station 1900b may be configured to forward transmissions that are received at the second base station 1900b from radioterminal 1930 to a diversity receiver 1902 at the first base station 1900a via a terrestrial wired and/or wireless link 1940. The diversity receiver also may be located, at least in part, outside the first base station 1900a. The diversity receiver 1902 may be used to combine the signals that are received at the second base station 1900b and the signals that are received at the base station 1900a from radioterminal 1930, to thereby increase the return link robustness and/or the available return link margin. As such, the available return link margin and/or structural attenuation margin provided by the infrastructure component may be increased, facilitating, via closed-loop power control of the radioterminal by the infrastructure component, a reduction in output power by the radioterminal, thereby reducing the potential of interference to a co-frequency system such as a co-frequency satellite system.

To increase or further increase the available return-link margin and/or return-link structural attenuation margin that may be provided by an infrastructure component, according to other embodiments of the present invention, at least one additional auxiliary antenna system 1910a–1910d may be disposed in the area/space between the cell edge and the base station tower of at least one ATC comprising the infrastructure component. FIG. 19 illustrates an infrastructure component configuration comprising two auxiliary antenna systems per ATC of the infrastructure component. However, greater or fewer auxiliary antenna systems 1910a–1910d may be used.

Still referring to FIG. 19, a diversity receiver 1902 may be configured to accept and process signals derived from the antenna systems of the first ATC 1900a, auxiliary antenna system 1910a, auxiliary antenna system 1910b, and from a base station processor 1930 associated with the second ATC 1900b. The signals derived from the auxiliary antenna systems 1910a and/or 1910b and/or from the antenna system of ATC tower 1900a may be sent to the diversity receiver 1902 via physical connection(s) and/or wirelessly. Similarly, the signals derived from the auxiliary antenna systems 1910c and/or 1910d and/or from the antenna system of ATC tower 1900b may be sent to the base station processor 1930 via physical connection(s) and/or wirelessly.

The base station processor 1930 may also comprise a diversity receiver. The diversity receiver 1902 and/or base station processor 1930 may be configured to combine signals in accordance with any conventional optimum and/or sub-optimum performance index such as, for example, maximal ratio combining. The auxiliary antenna system(s) 1910a–1910d may be configured to receive and/or transmit to/from radioterminals 1930. Embodiments where the auxiliary antenna system(s) is/are configured to transmit to radioterminals may increase the available forward-link margin and/or the forward-link structural attenuation margin of the infrastructure component.

Accordingly, a first ancillary terrestrial component for a satellite radioterminal system according to some embodiments of the present invention includes a subsystem, such as a base station tower 1900a that is configured to communicate terrestrially with a plurality a radioterminals 1930 over substantially the same frequency bands and/or air interfaces as the radioterminals communicate with a space-based component. A diversity receiver, such as diversity receiver 1902, is configured to diversity combine signals from a radiotelephone 1930 that are received by the first ancillary terrestrial component 1900a and/or by at least a second ancillary terrestrial component 1900b, and/or by an auxiliary antenna system 1910. The auxiliary antenna system may be located in the first cell 1920a, such as auxiliary antenna systems 1910a, 1910b, or may be included outside the cell, such as auxiliary antenna systems 1910c, 1910d. These embodiments may also be used to increase link margin, independent of control by an aggregate radiated power controller.

In conclusion, an ancillary terrestrial network can communicate terrestrially with a plurality of radioterminals over a plurality of frequency bands and/or a plurality of air interfaces, while the aggregate radiated power and/or power spectral density, over any pre-determined band of frequencies, may be limited to a predefined maximum.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A satellite radiotelephone system comprising:
    a space-based component that is configured to communicate with a plurality of radiotelephones over a plurality of frequency bands and/or a plurality of air interfaces;
    an ancillary terrestrial network that is configured to communicate terrestrially with the plurality of radiotelephones over substantially the plurality of frequency bands and/or substantially the plurality of air interfaces; and an aggregate radiated power controller that is configured to control the plurality of radiotelephones and/or the ancillary terrestrial network so as to limit an aggregate radiated power by the plurality of radiotelephones to a maximum aggregate radiated power;

wherein the plurality of frequency bands and/or the plurality of air interfaces comprise a GSM air interface and a CDMA air interface and wherein the aggregate radiated power controller is configured to control the plurality of radiotelephones and/or the ancillary terrestrial network, so as to limit the aggregate radiated power by the plurality of radiotelephones to a maximum aggregate radiated power substantially according to the following:

$$N_{GSM}+13,800 N_{CDMA}/107,894=13,800;$$

where $N_{GSM}$ denotes a number of co-frequency time slots that are using the GSM air interface and $N_{CDMA}$ denotes a number of co-frequency codes that are using the CDMA air interface.

2. A system according to claim 1 wherein the $N_{GSM}$ GSM time slots are at least partially co-frequency with the $N_{CDMA}$ CDMA codes.

3. A satellite radiotelephone system comprising:

a space-based component that is configured to communicate with a plurality of radiotelephones over a plurality of frequency bands and/or a plurality of air interfaces;

an ancillary terrestrial network that is configured to communicate terrestrially with the plurality of radiotelephones over substantially the plurality of frequency bands and/or substantially the plurality of air interfaces; and an aggregate radiated power controller that is configured to control the plurality of radiotelephones and/or the ancillary terrestrial network so as to limit an aggregate radiated power by the plurality of radiotelephones to a maximum aggregate radiated power;

wherein the plurality of frequency bands and/or the plurality of air interfaces comprise a GSM air interface, a cdma2000 air interface and/or a W-CDMA air interface and wherein the aggregate radiated power controller is configured to control the plurality of radiotelephones and/or the ancillary terrestrial network, so as to limit the aggregate radiated power by the plurality of radiotelephones to a maximum aggregate radiated power substantially according to the following:

$$N/8+M/50+L/200=R;$$

where N denotes a number of co-frequency time slots that are using the GSM air interface, M denotes a number of co-frequency codes that are using the cdma2000 interface, L denotes a number of co-frequency codes that are using the W-CDMA air interface and R denotes an authorized GSM-based frequency reuse.

4. A system according to claim 3, wherein the N GSM time slots, the M cdma2000 codes and the L W-CDMA codes are at least partially co-frequency.

5. A satellite radiotelephone system comprising:

a space-based component that is configured to communicate with a plurality of radiotelephones over a plurality of frequency bands and/or a plurality of air interfaces;

an ancillary terrestrial network that is configured to communicate terrestrially with the plurality of radiotelephones over substantially the plurality of frequency bands and/or substantially the plurality of air interfaces; and an aggregate radiated power controller that is configured to control the plurality of radiotelephones and/or the ancillary terrestrial network so as to limit an aggregate radiated power by the plurality of radiotelephones to a maximum aggregate radiated power;

wherein the aggregate radiated power controller is configured to control the plurality of radiotelephones and/or the ancillary terrestrial network, so as to limit the aggregate radiated power by the plurality of radiotelephones to a maximum aggregate radiated power according to the following:

$$\sum_{i=1}^{x} \frac{N_i}{F_i} = MARP;$$

where $N_i$ denotes a number of co-frequency channels that are using a given frequency band and/or air interface i, $F_i$ denotes a corresponding equivalence factor, which may be less than, greater than or equal to 1, for the given frequency band/air interface i, and MARP is a measure of the maximum aggregate radiated power.

6. A satellite radiotelephone system comprising:

a space-based component that is configured to communicate with a plurality of radiotelephones over a plurality of frequency bands and/or a plurality of air interfaces;

an ancillary terrestrial network that is configured to communicate terrestrially with the plurality of radiotelephones over substantially the plurality of frequency bands and/or substantially the plurality of air interfaces; and an aggregate radiated power controller that is configured to control the plurality of radiotelephones and/or the ancillary terrestrial network so as to limit an aggregate radiated power by the plurality of radiotelephones to a maximum aggregate radiated power;

wherein the aggregate radiated power controller is configured to control the plurality of radiotelephones and/or the ancillary terrestrial network, so as to limit the aggregate radiated power by the plurality of radiotelephones to a maximum aggregate radiated power according to the following:

$$\sum_{i=1}^{x} \frac{N_i}{F_i} = MARP;$$

where $N_i$ denotes a number of co-frequency channels that are using a given structural attenuation margin i for a given frequency band and/or air interface, $F_i$ denotes a corresponding equivalence factor, which may be less than, greater than or equal to 1, for the given structural attenuation margin i forte given frequency band/air interface, and MARP is a measure of the maximum aggregate radiated power.

7. A satellite radiotelephone system comprising:

a space-based component that is configured to communicate with a plurality of radiotelephones over a plurality of frequency bands and/or a plurality of air interfaces;

an ancillary terrestrial network that is configured to communicate terrestrially with the plurality of radiotelephones over substantially the plurality of frequency bands and/or substantially the plurality of air interfaces; and an aggregate radiated power controller that is configured to control the plurality of radiotelephones and/or the ancillary terrestrial network so as to limit an aggregate radiated power by the plurality of radiotelephones to a maximum aggregate radiated power;

wherein the aggregate radiated power controller is configured to control the plurality of radiotelephones and/or the ancillary terrestrial network, so as to limit the aggregate radiated power by a plurality of co-frequency radiotelephones to a maximum aggregate radiated power according to the following:

$$\sum_{i=1}^{x}(psd)_i = MARP;$$

where $(psd)_i$ denotes a measure of radiated power spectral density from an $i^{th}$ radiotelephone at a satellite and MARP is a measure of the allowed maximum aggregate radiated power.

8. A system according to claim 7 where $(psd)_i$ is determined substantially according to the following:

$(psd)_i = 10^{[log(p_i/BW_i)+log(\alpha_i)]};$ where $10log(p_i)$ denotes a measure of maximum radiated power from an $i^{th}$ radiotelephone in a direction of a satellite, $BW_i$ denotes a bandwidth occupied by a carrier that is radiated by the $i^{th}$ radiotelephone and $10log(\alpha_i)$ denotes a measure of signal attenuation between the $i^{th}$ radiotelephone and the satellite.

9. A system according to claim 7 wherein the aggregate radiated power controller is configured to control the plurality of radiotelephones and/or the ancillary terrestrial network by controlling at least one selected radiotelephone and/or at least one radiotelephone that is subject to a low structural attenuation margin, so as to limit the aggregate radiated power by a plurality of co-frequency radiotelephones to a maximum aggregate radiated power.

10. A system according to claim 7 wherein the aggregate radiated power controller is configured to control the plurality of radiotelephones and/or the ancillary terrestrial network by controlling at least one radiotelephone that is communicating with the ancillary terrestrial network over a frequency band and/or carrier frequency and/or air interface that has exceeded a maximum aggregate radiated power for the frequency band and/or carrier frequency and/or air interface, so as to limit the aggregate radiated power by the plurality of radiotelephones for the frequency band and/or carrier frequency and/or air interface to a maximum aggregate radiated power for the frequency band and/or carrier frequency and/or air interface.

11. A system according to claim 7 wherein the aggregate radiated power controller is configured to control the plurality of radiotelephones and/or the ancillary terrestrial network by reducing a radiated power of at least one of the radiotelephones, by reducing a vocoder rate of at least one of the radiotelephones, by reducing a rate of information transmission of at least one of the radiotelephones and/or by controlling at least one of the radiotelephones to communicate using a frequency that has not exceeded the maximum aggregated radiated power, so as to limit the aggregate radiated power by the plurality of radiotelephones to the maximum aggregate radiated power.

12. A system according to claim 7 wherein the ancillary terrestrial network comprises a plurality of ancillary terrestrial components and wherein the aggregate radiated power controller is configured to control the plurality of radiotelephones and/or the ancillary terrestrial network to diversity combine signals that are received from at least one radiotelephone by at least two ancillary terrestrial components and/or by an ancillary terrestrial component and an auxiliary antenna system to thereby reduce the radiated power by the at least one radiotelephone.

13. A system according to claim 7 wherein the aggregate radiated power controller is configured to control a subset of the plurality of radiotelephones so as to limit an aggregate radiated power by the subset of the plurality of radiotelephones to a maximum aggregate radiated power.

14. A system according to claim 13 wherein the plurality of frequency bands comprises a first frequency band and a second frequency band and wherein the subset of the plurality of radiotelephones comprises radiotelephones that communicate terrestrially with the ancillary terrestrial network over substantially the first frequency band.

15. A system according to claim 14 wherein the first frequency band comprises L-band frequencies.

16. A system according to claim 15 wherein the second frequency band comprises S-band frequencies.

17. A system according to claim 14 wherein the first frequency band comprises L-band frequencies that are used substantially inter-radio-horizon by another system and wherein the second frequency band comprises L-band frequencies that are not used substantially inter-radio-horizon by another system.

18. A system according to claim 17 wherein the second frequency band further comprises S-band frequencies.

19. A system according to claim 7 wherein the space-based component comprises a gateway and wherein the aggregate radiated power controller is located at least in part in the gateway, in the ancillary terrestrial network and/or in a stand-alone component that interfaces with the gateway and/or the ancillary terrestrial network.

20. A system according to claim 7 wherein the ancillary terrestrial network comprises a first portion that is configured to communicate terrestrially with a first radiotelephone over substantially a first frequency band and/or substantially a first air interface, and a second portion that is configured to communicate terrestrially with a second and/or the first radiotelephone over substantially a second frequency band and/or substantially a second air interface.

21. A system according to claim 7 further comprising a plurality of radiotelephones that are controlled by the aggregate radiated power controller.

22. A system according to claim 7 wherein the aggregate radiated power controller is configured to determine the aggregate radiated power by the plurality of radiotelephones and to limit the aggregate radiated power by the plurality of radiotelephones to the maximum aggregate radiated power.

23. A system according to claim 7 wherein the maximum aggregate radiated power is independent of the number the radiotelephones.

24. A satellite radiotelephone communications method comprising:

communicating between a space-based component and a plurality of radiotelephones over a plurality of frequency bands and/or a plurality of air interfaces;

communicating terrestrially with the plurality of radiotelephones over substantially the plurality of frequency bands and/or substantially the plurality of air interfaces; and controlling the plurality of radiotelephones and/or the ancillary terrestrial network so as to limit an aggregate radiated power by the plurality of radiotelephones to a maximum aggregate radiated power;

wherein the plurality of frequency bands and/or the plurality of air interfaces comprise a GSM air interface and a CDMA air interface and wherein controlling the plurality of radiotelephones and/or the ancillary terrestrial network so as to limit the aggregate radiated power by the plurality of radiotelephones to a maximum aggregate radiated power comprises controlling the plurality of radiotelephones substantially according to the following:

$$N_{GSM} + 13{,}800 N_{CDMA}/107{,}894 = 13{,}800;$$

where $N_{GSM}$ denotes a number of co-frequency time slots that are using the GSM air interface and $N_{CDMA}$ denotes a number of co-frequency codes that are using the CDMA air interface.

25. A method according to claim 24 wherein the $N_{GSM}$ GSM time slots are at least partially co-frequency with the $N_{CDMA}$ CDMA codes.

26. A satellite radiotelephone communications method comprising:

communicating between a space-based component and a plurality of radiotelephones over a plurality of frequency bands and/or a plurality of air interfaces;

communicating terrestrially with the plurality of radiotelephones over substantially the plurality of frequency bands and/or substantially the plurality of air interfaces; and controlling the plurality of radiotelephones and/or the ancillary terrestrial network so as to limit an aggregate radiated power by the plurality of radiotelephones to a maximum aggregate radiated power;

wherein the plurality of frequency bands and/or a plurality of air interfaces comprise a GSM air interface, a cdma2000 air interface and/or a W-CDMA air interface and wherein controlling the plurality of radiotelephones and/or the ancillary terrestrial network, so as to limit the aggregate radiated power by the plurality of radiotelephones to a maximum aggregate radiated power comprises controlling the plurality of radiotelephones substantially according to the following:

$$N/8 + M/50 + L/200 = R;$$

where N denotes a number of co-frequency time slots that are using the GSM air interface, M denotes a number of co-frequency codes that are using the cdma2000 air interface, L denotes a number of co-frequency codes that are using the W-CDMA air interface, and R denotes an authorized GSM-based frequency reuse.

27. A method according to claim 26, wherein the N GSM time slots, the M cdma2000 codes and the L W-CDMA codes are at least partially co-frequency.

28. A satellite radiotelephone communications method comprising:

communicating between a space-based component and a plurality of radiotelephones over a plurality of frequency bands and/or a plurality of air interfaces;

communicating terrestrially with the plurality of radiotelephones over substantially the plurality of frequency bands and/or substantially the plurality of air interfaces; and controlling the plurality of radiotelephones and/or the ancillary terrestrial network so as to limit an aggregate radiated power by the plurality of radiotelephones to a maximum aggregate radiated power;

wherein controlling the plurality of radiotelephones and/or the ancillary terrestrial network, so as to limit the aggregate radiated power by the plurality of radiotelephones to a maximum aggregate radiated power is performed according to the following:

$$\sum_{i=1}^{x} \frac{N_i}{F_i} = MARP;$$

where $N_i$ denotes a number of co-frequency channels that are using a given frequency band and/or air interface i, $F_i$ denotes a corresponding equivalence factor, which may be less than, greater than or equal to 1, for the given frequency band/air interface i, and MARP is a measure of the maximum aggregate radiated power.

29. A satellite radiotelephone communications method comprising:

communicating between a space-based component and a plurality of radiotelephones over a plurality of frequency bands and/or a plurality of air interfaces;

communicating terrestrially with the plurality of radiotelephones over substantially the plurality of frequency bands and/or substantially the plurality of air interfaces; and controlling the plurality of radiotelephones and/or the ancillary terrestrial network so as to limit an aggregate radiated power by the plurality of radiotelephones to a maximum aggregate radiated power;

wherein controlling the plurality of radiotelephones and/or the ancillary terrestrial network, so as to limit the aggregate radiated power by the plurality of radiotelephones to a maximum aggregate radiated power is performed according to the following:

$$\sum_{i=1}^{x} \frac{N_i}{F_i} = MARP;$$

where $N_i$ denotes a number of co-frequency channels that are using a given structural attenuation margin i for a given frequency band and/or air interface, $F_i$ denotes a corresponding equivalence factor, which may be less than, greater than or equal to 1, for the given structural attenuation margin i for the given frequency band/air interface, and MARP is a measure of the maximum aggregate radiated power.

30. A satellite radiotelephone communications method comprising:

communicating between a space-based component and a plurality of radiotelephones over a plurality of frequency bands and/or a plurality of air interfaces;

communicating terrestrially with the plurality of radiotelephones over substantially the plurality of frequency bands and/or substantially the plurality of air interfaces; and controlling the plurality of radiotelephones and/or the ancillary terrestrial network so as to limit an aggregate radiated power by the plurality of radiotelephones to a maximum aggregate radiated power;

wherein controlling the plurality of radiotelephones and/or the ancillary terrestrial network, so as to limit the aggregate radiated power by a plurality of co-frequency radiotelephones to a maximum aggregate radiated power is performed according to the following:

$$\sum_{i=1}^{x} (psd)_i = MARP;$$

where $(psd)_i$ denotes a measure of radiated power spectral density from an $i^{th}$ radiotelephone at a satellite and MARP is a measure of the allowed maximum aggregate radiated power.

31. A method according to claim 30 where $(psd)_i$ is determined substantially according to the following:

$$(psd)_i = 10^{[log(p_i/BW_i) + log(\alpha_i)]};$$

where $10log(p_i)$ denotes a measure of maximum radiated power from an $i^{th}$ radiotelephone in a direction of a satellite, $BW_i$ denotes a bandwidth occupied by a carrier that is radiated by the $i^{th}$ radiotelephone and $10log(\alpha_i)$ denotes a measure of signal attenuation between the $i^{th}$ radiotelephone and the satellite.

32. A method according to claim 30 wherein controlling the plurality of radiotelephones and/or the ancillary terrestrial network comprises controlling at least one selected radiotelephone and/or at least one radiotelephone that is subject to a lowest structural attenuation margin, so as to limit the aggregate radiated power by a plurality of co-frequency radiotelephones to a maximum aggregate radiated power.

33. A method according to claim 30 wherein controlling the plurality of radiotelephones and/or the ancillary terrestrial network comprises controlling at least one radiotelephone that is communicating with the ancillary terrestrial network over a frequency band and/or carrier frequency and/or air interface that has exceeded a maximum aggregate radiated power for the frequency band and/or carrier frequency and/or air interface, so as to limit the aggregate radiated power by the plurality of radiotelephones for the frequency band and/or carrier frequency and/or air interface to a maximum aggregate radiated power for the frequency band and/or carrier frequency and/or air interface.

34. A method according to claim 30 wherein controlling the plurality of radiotelephones and/or the ancillary terrestrial network comprises reducing a radiated power of at least one of the radiotelephones, by reducing a vocoder rate of at least one of the radiotelephones, and/or by reducing a rate of information transmission of at least one of the radiotelephones and/or controlling at least one of to radiotelephones to communicate using a frequency that has not exceeded the maximum aggregated radiated power, so as to limit the aggregate radiated power by the plurality of radiotelephones to the maximum aggregate radiated power.

35. A method according to claim 30 wherein the ancillary terrestrial network comprises a plurality of ancillary terrestrial components and wherein controlling the plurality of radiotelephones and/or the ancillary terrestrial network comprises diversity combining signals that are received from at least one radiotelephone by at least two ancillary terrestrial components and/or by an ancillary terrestrial component and an auxiliary antenna system to thereby reduce the radiated power by the at least one radiotelephone.

36. A method according to claim 30 wherein controlling the plurality of radiotelephones and/or the ancillary terrestrial network comprises controlling a subset of the plurality of radiotelephones so as to limit an aggregate radiated power by the subset of the plurality of radiotelephones to a maximum aggregate radiated power.

37. A method according to claim 36 wherein the plurality of frequency bands comprises a first frequency band and a second frequency band and wherein the subset of the plurality of radiotelephones comprises radiotelephones that communicate terrestrially with the ancillary terrestrial network over substantially the first frequency band.

38. A method according to claim 37 wherein the first frequency band comprises L-band frequencies.

39. A method according to claim 38 wherein the second frequency band comprises S-band frequencies.

40. A method according to claim 37 wherein the first frequency band comprises L-band frequencies that are used substantially inter-radio-horizon by another system and wherein the second frequency band comprises L-band frequencies that are not used substantially inter-radio-horizon by another system.

41. A method according to claim 40 wherein the second frequency band further comprises S-band frequencies.

42. A method according to claim 30 wherein the space-based component comprises a gateway and wherein controlling the plurality of radiotelephones and/or the ancillary terrestrial network so as to limit an aggregate radiated power by the plurality of radiotelephones to a maximum aggregate radiated power is performed at least in part in the gateway, in the ancillary terrestrial network, and/or in a stand-alone component that interfaces with the gateway and/or the ancillary terrestrial network.

43. A method according to claim 30 wherein communicating terrestrially with the plurality of radiotelephones over substantially the plurality of frequency bands and/or substantially the plurality of air interfaces is performed by respective first and second portions of an ancillary terrestrial network that are configured to communicate terrestrially with a first radiotelephone over substantially the first frequency band and/or substantially the first air interface, and to communicate terrestrially with the second and/or first radiotelephone over substantially the second frequency band and/or substantially the second air interface, respectively.

44. A method according to claim 43 wherein the first portion is operated by a first wireless network operator and the second portion is operated by a second wireless network operator.

45. A method according to claim 30 wherein controlling the plurality of radiotelephones and/or the ancillary terrestrial network is preceded by determining the aggregate radiated power by the plurality of radiotelephones.

46. A method according to claim 30 wherein the maximum aggregate radiated power is independent of the number the radiotelephones.

47. Apparatus for controlling a satellite radiotelephone system that comprises a space-based component that is configured to communicate with a plurality of radiotelephones over a plurality of frequency bands and/or a plurality of air interfaces and an ancillary terrestrial network that is configured to communicate terrestrially with the plurality of radiotelephones over substantially the plurality of frequency bands and/or substantially the plurality of air interfaces, the apparatus comprising:

an aggregate radiated power controller that is configured to control the plurality of radiotelephones and/or the ancillary terrestrial network so as to limit the aggregate radiated power by the plurality of radiotelephones to a maximum aggregate radiated power;

wherein the plurality of frequency bands and/or the plurality of air interfaces comprise a GSM air interface and a CDMA air interface and wherein the aggregate radiated power controller is configured to control the plurality of radiotelephones and/or the ancillary terrestrial network, so as to limit the aggregate radiated power by the plurality of radiotelephones to a maximum aggregate radiated power substantially according to the following:

$N_{GSM}+13,800 N_{CDMA}/107,894=13,800;$ where $N_{GSM}$ denotes a number of co-frequency time slots that are using the GSM air interface and $N_{CDMA}$ denotes a number of co-frequency codes that are using the CDMA air interface.

48. An apparatus according to claim 47 wherein the $N_{GSM}$ GSM time slots are at least partially co-frequency with the $N_{CDMA}$ CDMA codes.

49. Apparatus for controlling a satellite radiotelephone system that comprises a space-based component that is configured to communicate with a plurality of radiotelephones over a plurality of frequency bands and/or a plurality of air interfaces and an ancillary terrestrial network that is configured to communicate terrestrially with the plurality of radiotelephones over substantially the plurality of frequency bands and/or substantially the plurality of air interfaces, the apparatus comprising:

an aggregate radiated power controller that is configured to control the plurality of radiotelephones and/or the ancillary terrestrial network so as to limit the aggregate radiated power by the plurality of radiotelephones to a maximum aggregate radiated power;

wherein the plurality of frequency bands and/or the plurality of air interfaces comprise a GSM air interface, a cdma2000 air interface and/or a W-CDMA air interface and wherein the aggregate radiated power controller is configured to control the plurality of radiotelephones and/or the ancillary terrestrial network, so as to limit the aggregate radiated power by the plurality of radiotelephones to a maximum aggregate radiated power substantially according to the following:

$N/8+M/50+L/200=R;$ where N denotes a number of co-frequency time slots that are using the GSM air interface, M denotes a number of co-frequency codes that are using the cdma2000 air interface, L denotes a number of co-frequency codes that are using the W-CDMA air interface, and R denotes an authorized GSM-based frequency reuse.

50. An apparatus according to claim 49 wherein the N GSM time slots, the M cdma2000 codes and the L W-CDMA codes are at least partially co-frequency.

51. Apparatus for controlling a satellite radiotelephone system that comprises a space-based component that is configured to communicate with a plurality of radiotelephones over a plurality of frequency bands and/or a plurality of air interfaces and an ancillary terrestrial network that is configured to communicate terrestrially with the plurality of radiotelephones over substantially the plurality of frequency bands and/or substantially the plurality of air interfaces, the apparatus comprising:

an aggregate radiated power controller that is configured to control the plurality of radiotelephones and/or the ancillary terrestrial network so as to limit the aggregate radiated power by the plurality of radiotelephones to a maximum aggregate radiated power;

wherein the aggregate radiated power controller is configured to control the plurality of radiotelephones and/or the ancillary terrestrial network, so as to limit the aggregate radiated power by the plurality of radiotelephones to a maximum aggregate radiated power according to the following:

$$\sum_{i=1}^{x} \frac{N_i}{F_i} = MARP;$$

where $N_i$ denotes a number of co-frequency channels that are using a given frequency band and/or air interface i, $F_i$ denotes a corresponding equivalence factor, which may be less than, greater than or equal to 1, for the given frequency band/air interface i, and MARP is a measure of the maximum aggregate radiated power.

52. Apparatus for controlling a satellite radiotelephone system that comprises a space-based component that is configured to communicate with a plurality of radiotelephones over a plurality of frequency bands and/or a plurality of air interfaces and an ancillary terrestrial network that is configured to communicate terrestrially with the plurality of radiotelephones over substantially the plurality of frequency bands and/or substantially the plurality of air interfaces, the apparatus comprising:

an aggregate radiated power controller that is configured to control the plurality of radiotelephones and/or the ancillary terrestrial network so as to limit the aggregate radiated power by the plurality of radiotelephones to a maximum aggregate radiated power;

wherein the aggregate radiated power controller is configured to control the plurality of radiotelephones and/or the ancillary terrestrial network, so as to limit the aggregate radiated power by the plurality of radiotelephones to a maximum aggregate radiated power according to the following:

$$\sum_{i=1}^{x} \frac{N_i}{F_i} = MARP;$$

where $N_i$ denotes a number of co-frequency channels that are using a given structural attenuation margin i for a given frequency band and/or air interface, $F_i$ denotes a corresponding equivalence factor, which may be less than, greater than or equal to 1, for the given structural attenuation margin i for the given frequency band/air interface, and MARP is a measure of the maximum aggregate radiated power.

53. Apparatus for controlling a satellite radiotelephone system that comprises a space-based component that is configured to communicate with a plurality of radiotelephones over a plurality of frequency bands and/or a plurality of air interfaces and an ancillary terrestrial network that is configured to communicate terrestrially with the plurality of radiotelephones over substantially the plurality of frequency bands and/or substantially the plurality of air interfaces, the apparatus comprising:

an aggregate radiated power controller that is configured to control the plurality of radiotelephones and/or the ancillary terrestrial network so as to limit the aggregate radiated power by the plurality of radiotelephones to a maximum aggregate radiated power;

wherein the aggregate radiated power controller is configured to control the plurality of radiotelephones and/or the ancillary terrestrial network, so as to limit the aggregate radiated power by a plurality of co-frequency radiotelephones to a maximum aggregate radiated power according to the following:

$$\sum_{i=1}^{x}(psd)_i = MARP;$$

where $(psd)_i$ denotes a measure of radiated power spectral density from an $i^{th}$ radiotelephone at a satellite and MARP is a measure of the allowed maximum aggregate radiated power.

54. An apparatus according to claim 53 where $(psd)_i$ is determined substantially according to the following:

$$(psd)_i = 10^{[log(p_i/BW_i)+log(\alpha_i)]};$$

where $10log(p_i)$ denotes a measure of maximum radiated power from an $i^{th}$ radiotelephone in a direction of a satellite, $BW_i$ denotes a bandwidth occupied by a carrier that is radiated by the $i^{th}$ radiotelephone and $10log(\alpha_i)$ denotes a measure of signal attenuation between the $i^{th}$ radiotelephone and the satellite.

55. An apparatus according to claim 53 wherein the aggregate radiated power controller is configured to control the plurality of radiotelephones and/or the ancillary terrestrial network by controlling at least one selected radiotelephone and/or at least one radiotelephone that is subject to a low structural attenuation margin, so as to limit the aggregate radiated power by a plurality of co-frequency radiotelephones to a maximum aggregate radiated power.

56. An apparatus according to claim 53 wherein the aggregate radiated power controller is configured to control the plurality of radiotelephones and/or the ancillary terrestrial network by controlling at least one radiotelephone that is communicating with the ancillary terrestrial network over a frequency band and/or carrier frequency and/or air interface that has exceeded a maximum aggregate radiated power for the frequency band and/or carrier frequency and/or air interface, so as to limit the aggregate radiated power by the plurality of radiotelephones for the frequency band and/or carrier frequency and/or air interface to a maximum aggregate radiated power for the frequency band and/or carrier frequency and/or air interface.

57. An apparatus according to claim 53 wherein the aggregate radiated power controller is configured to control the plurality of radiotelephones and/or the ancillary terrestrial network by reducing a radiated power of at least one of the radiotelephones, by reducing a vocoder rate of at least one of the radiotelephones, by reducing a rate of information transmission of at least one of the radiotelephones and/or by controlling at least one of the radiotelephones to communicate using a frequency that has not exceeded the maximum aggregated radiated power, so as to limit the aggregate radiated power by the plurality of radiotelephones to the maximum aggregate radiated power.

58. An apparatus according to claim 53 wherein the ancillary terrestrial network comprises a plurality of ancillary terrestrial components and wherein the aggregate radiated power controller is configured to control the ancillary terrestrial network to diversity combine signals that are received from at least one radiotelephone by at least two ancillary terrestrial components and/or by an ancillary terrestrial component and an auxiliary antenna system to thereby reduce the radiated power by the at least one radiotelephone.

59. An apparatus according to claim 53 wherein the aggregate radiated power controller is configured to control a subset of the plurality of radiotelephones so as to limit an aggregate radiated power by the subset of the plurality of radiotelephones to a maximum aggregate radiated power.

60. An apparatus according to claim 59 wherein the plurality of frequency bands comprises a first frequency band and a second frequency band and wherein the subset of the plurality of radiotelephones comprises radiotelephones that communicate terrestrially with the ancillary terrestrial network over substantially the first frequency band.

61. An apparatus according to claim 60 wherein the first frequency band comprises L-band frequencies.

62. An apparatus according to claim 61 wherein the second frequency band comprises S-band frequencies.

63. An apparatus according to claim 60 wherein the first frequency band comprises L-band frequencies that are used substantially inter-radio-horizon by another system and wherein the second frequency band comprises L-band frequencies that are not used substantially inter-radio-horizon by another system.

64. An apparatus according to claim 63 wherein the second frequency band further comprises S-band frequencies.

65. An apparatus according to claim 53 wherein the space-based component comprises a gateway and wherein the aggregate radiated power controller is located at least in part in the gateway, in the ancillary terrestrial network and/or in a stand-alone component that interfaces with the gateway and/or the ancillary terrestrial network.

66. An apparatus according to claim 53 wherein the ancillary terrestrial network comprises a first portion that is configured to communicate terrestrially with a first radiotelephone over substantially a first frequency band and/or substantially a first air interface, and a second portion that is configured to communicate terrestrially with a second and/or the first radiotelephone over substantially a second frequency band and/or substantially a second air interface.

67. An apparatus according to claim 53 further comprising a plurality of radiotelephones that are controlled by the aggregate radiated power controller.

68. An apparatus according to claim 53 wherein the aggregate radiated power controller is configured to determine the aggregate radiated power by the plurality of radiotelephones and to limit the aggregate radiated power by the plurality of radiotelephones to the maximum aggregate radiated power.

69. An apparatus according to claim 53 wherein the maximum aggregate radiated power is independent of the number the radiotelephones.

70. A method for controlling a satellite radiotelephone system that comprises a space-based component that is configured to communicate with a plurality of radiotelephones over a plurality of frequency bands and/or a plurality of air interfaces and an ancillary terrestrial network that is configured to communicate terrestrially with the plurality of radiotelephones over substantially the plurality of frequency bands and/or substantially the plurality of air interfaces, the apparatus comprising:

controlling the plurality of radiotelephones and/or the ancillary terrestrial network so as to limit the aggregate radiated power by the plurality of radiotelephones to a maximum aggregate radiated power;

wherein the plurality of frequency bands and/or the plurality of air interfaces comprise a GSM air interface and a CDMA air interface and wherein controlling the plurality of radiotelephones and/or the ancillary terrestrial network, so as to limit the aggregate radiated power by the plurality of radiotelephones to a maximum aggregate radiated power comprises controlling the plurality of radiotelephones substantially according to the following:

$N_{GSM}+13,800 N_{CDMA}/107,894=13,800$;

where $N_{GSM}$ denotes a number of co-frequency time slots that are using the GSM air interface and $N_{CDMA}$ denotes a number of co-frequency codes that are using the CDMA air interface.

71. A method according to claim 70 wherein the $N_{GSM}$ GSM time slots are at least partially co-frequency with the $N_{CDMA}$ CDMA codes.

72. A method for controlling a satellite radiotelephone system that comprises a space-based component that is configured to communicate with a plurality of radiotelephones over a plurality of frequency bands and/or a plurality of air interfaces and an ancillary terrestrial network that is configured to communicate terrestrially with the plurality of radiotelephones over substantially the plurality of frequency bands and/or substantially the plurality of air interfaces, the apparatus comprising:

controlling the plurality of radiotelephones and/or the ancillary terrestrial network so as to limit the aggregate radiated power by the plurality of radiotelephones to a maximum aggregate radiated power;

wherein the plurality of frequency bands and/or a plurality of air interfaces comprise a GSM air interface, a cdma2000 air interface and/or a W-CDMA air interface and wherein controlling the plurality of radiotelephones and/or the ancillary terrestrial network, so as to limit the aggregate radiated power by the plurality of radiotelephones to a maximum aggregate radiated power comprises controlling the plurality of radiotelephones substantially according to the following:

$N/8+M/50+L/200=R$;

where N denotes a number of co-frequency time slots that are using the GSM air interface, M denotes a number of co-frequency codes that are using the cdma2000 air interface, L denotes a number of co-frequency codes that are using the W-CDMA air interface, and R denotes an authorized GSM-based frequency reuse.

73. A method according to claim 72, wherein the N GSM time slots, the M cdma2000 codes and the L W-CDMA codes are at least partially co-frequency.

74. A method for controlling a satellite radiotelephone system that comprises a space-based component that is configured to communicate with a plurality of radiotelephones over a plurality of frequency bands and/or a plurality of air interfaces and an ancillary terrestrial network that is configured to communicate terrestrially with the plurality of radiotelephones over substantially the plurality of frequency bands and/or substantially the plurality of air interfaces, the apparatus comprising:

controlling the plurality of radiotelephones and/or the ancillary terrestrial network so as to limit the aggregate radiated power by the plurality of radiotelephones to a maximum aggregate radiated power;

wherein controlling the plurality of radiotelephones and/or the ancillary terrestrial network, so as to limit the aggregate radiated power by the plurality of radiotelephones to a maximum aggregate radiated power is performed according to the following:

$$\sum_{i=1}^{x} \frac{N_i}{F_i} = MARP;$$

where $N_i$ denotes a number of co-frequency channels that are using a given frequency band and/or air interface i, $F_i$ denotes a corresponding equivalence factor, which may be less than, greater than or equal to 1, for the given frequency band/air interface i, and MARP is a measure of the maximum aggregate radiated power.

75. A method for controlling a satellite radiotelephone system that comprises a space-based component that is configured to communicate with a plurality of radiotelephones over a plurality of frequency bands and/or a plurality of air interfaces and an ancillary terrestrial network that is configured to communicate terrestrially with the plurality of radiotelephones over substantially the plurality of frequency bands and/or substantially the plurality of air interfaces, the apparatus comprising:

controlling the plurality of radiotelephones and/or the ancillary terrestrial network so as to limit the aggregate radiated power by the plurality of radiotelephones to a maximum aggregate radiated power;

wherein controlling the plurality of radiotelephones and/or the ancillary terrestrial network, so as to limit the aggregate radiated power by the plurality of radiotelephones to a maximum aggregate radiated power is performed according to the following:

$$\sum_{i=1}^{x} \frac{N_i}{F_i} = MARP;$$

where $N_i$ denotes a number of co-frequency channels that are using a given structural attenuation margin i for a given frequency band and/or air interface, $F_i$ denotes a corresponding equivalence factor, which may be less than, greater than or equal to 1, for the given structural attenuation margin i for the given frequency band/air interface, and MARP is a measure of the maximum aggregate radiated power.

76. A method for controlling a satellite radiotelephone system that comprises a space-based component that is configured to communicate with a plurality of radiotelephones over a plurality of frequency bands and/or a plurality of air interfaces and an ancillary terrestrial network that is configured to communicate terrestrially with the plurality of radiotelephones over substantially the plurality of frequency bands and/or substantially the plurality of air interfaces, the apparatus comprising:

controlling the plurality of radiotelephones and/or the ancillary terrestrial network so as to limit the aggregate radiated power by the plurality of radiotelephones to a maximum aggregate radiated power;

wherein controlling the plurality of radiotelephones and/or the ancillary terrestrial network, so as to limit the aggregate radiated power by a plurality of co-frequency radiotelephones to a maximum aggregate radiated power is performed according to the following:

$$\sum_{i=1}^{x}(psd)_i = MARP,$$

where $(psd)_i$ denotes a measure of radiated power spectral density from an $i^{th}$ radiotelephone at a satellite and MARP is a measure of the allowed maximum aggregate radiated power.

77. A method according to claim 76 where $(psd)_i$ is determined substantially according to the following:

$$(psd)_i=10^{[log(p_i/BW_i)+log(\alpha_i)]};$$

where $10log(p_i)$ denotes a measure of maximum radiated power from an $i^{th}$ radiotelephone in a direction of a satellite, $BW_i$ denotes a bandwidth occupied by a carrier that is radiated by the $i^{th}$ radiotelephone and $10log(\alpha_i)$ denotes a measure of signal attenuation between the $i^{th}$ radiotelephone and the satellite.

78. A method according to claim 76 wherein controlling the plurality of radiotelephones and/or the ancillary terrestrial network comprises controlling at least one selected radiotelephone and/or at least one radiotelephone that is subject to a low structural attenuation margin, so as to limit the aggregate radiated power by a plurality of co-frequency radiotelephones to a maximum aggregate radiated power.

79. A method according to claim 76 wherein controlling the plurality of radiotelephones and/or the ancillary terrestrial network comprises controlling at least one radiotelephone that is communicating with the ancillary terrestrial network over a frequency band and/or carrier frequency and/or air interface that has exceeded a maximum aggregate radiated power for the frequency band and/or carrier frequency and/or air interface, so as to limit the aggregate radiated power by the plurality of radiotelephones for the frequency band and/or carrier frequency and/or air interface to a maximum aggregate radiated power for the frequency bend and/or carrier frequency and/or air interface.

80. A method according to claim 76 wherein controlling the plurality of radiotelephones and/or the ancillary terrestrial network comprises reducing a radiated power of at least one of the radiotelephones, by reducing a vocoder rate of at least one of the radiotelephones, and/or by reducing a rate of information transmission of at least one of the radiotelephones and/or controlling at least one of the radiotelephones to communicate using a frequency that has not exceeded the maximum aggregated radiated power, so as to limit the aggregate radiated power byte plurality of radiotelephones to the maximum aggregate radiated power.

81. A method according to claim 76 wherein the ancillary terrestrial network comprises a plurality of ancillary terrestrial components and wherein controlling the plurality of radiotelephones and/or the ancillary terrestrial network comprises diversity combining signals that are received from at least one radiotelephone by at least two ancillary terrestrial components and/or by an ancillary terrestrial component and an auxiliary antenna system to thereby reduce the radiated power by the at least one radiotelephone.

82. A method according to claim 76 wherein controlling the plurality of radiotelephones and/or the ancillary terrestrial network comprises controlling a subset of the plurality of radiotelephones so as to limit an aggregate radiated power by the subset of the plurality of radiotelephones to a maximum aggregate radiated power.

83. A method according to claim 82 wherein the plurality of frequency bands comprises a first frequency band and a second frequency band and wherein the subset of the plurality of radiotelephones comprises radiotelephones that communicate terrestrially with the ancillary terrestrial network over substantially the first frequency band.

84. A method according to claim 83 wherein the first frequency band comprises L-band frequencies.

85. A method according to claim 84 wherein the second frequency band comprises S-band frequencies.

86. A method according to claim 83 wherein the first frequency band comprises L-band frequencies that are used substantially inter-radio-horizon by another system and wherein the second frequency band comprises L-band frequencies that are not used substantially inter-radio-horizon by another system.

87. A method according to claim 86 wherein the second frequency band further comprises S-band frequencies.

88. A method according to claim 76 wherein the space-based component comprises a gateway and wherein controlling the plurality of radiotelephones and/or the ancillary terrestrial network so as to limit an aggregate radiated power by the plurality of radiotelephones to a maximum aggregate radiated power is performed at least in part in the gateway, in the ancillary terrestrial network, and/or in a stand-alone component that interfaces with the gateway and/or the ancillary terrestrial network.

89. A method according to claim 76 wherein communicating terrestrially with the plurality of radiotelephones over substantially the plurality of frequency bands and/or substantially the plurality of air interfaces is performed by respective first and second portions of an ancillary terrestrial network that are configured to communicate terrestrially with a first radiotelephone over substantially the first frequency band and/or substantially the first air interface, and to communicate terrestrially with the second and/or first radiotelephone over substantially the second frequency band and/or substantially the second air interface, respectively.

90. A method according to claim 89 wherein the first portion is operated by a first wireless network operator and the second portion is operated by a second wireless network operator.

91. A method according to claim 76 wherein controlling the plurality of radiotelephones and/or the ancillary terrestrial network is preceded by determining the aggregate radiated power by the plurality of radiotelephones.

92. A method according to claim 76 wherein the maximum aggregate radiated power is independent of the number the radiotelephones.

93. An ancillary terrestrial network for a satellite radiotelephone system that includes a space-based component that is configured to communicate with a plurality of radiotelephones over a satellite frequency band, the ancillary terrestrial network comprising:

a plurality of ancillary terrestrial components that are configured to communicate terrestrially with the plurality of radiotelephones over substantially the satellite frequency band; and a diversity receiver that is configured to diversity combine at least two satellite frequency band signals from a radiotelephone that are received by a first ancillary terrestrial component, that are received by a second ancillary terrestrial component and/or that are received by an auxiliary antenna system.

94. An ancillary terrestrial network according to claim 91 wherein the second ancillary terrestrial component is adjacent the first ancillary terrestrial component.

95. An ancillary terrestrial network according to claim 93 in combination with the auxiliary antenna system.

96. An ancillary terrestrial network according to claim 94 wherein the first ancillary terrestrial component communicates with the plurality of radiotelephones over an area that defines a cell, and wherein the auxiliary antenna system is located within and/or outside the cell.

97. An ancillary terrestrial network according to claim 93 wherein the diversity receiver that is configured to diversity combine at least two satellite frequency band signals from a radiotelephone that are received by a first ancillary terrestrial component, that are received by a second ancillary terrestrial component and/or that are received by an auxiliary antenna system comprises a space diversity and/or a polarization diversity receiver and wherein the at least two satellite frequency band signals from the radiotelephone are received by the first ancillary terrestrial component, by the second ancillary terrestrial component and/or by the auxiliary antenna system using at least two spatially separated antennas and/or at least two different antenna polarizations.

98. A first ancillary terrestrial component for a satellite radiotelephone system that includes a space-based component that is configured to communicate with a plurality of radiotelephones over a satellite frequency band, the first ancillary terrestrial component comprising:
a subsystem that is configured to communicate terrestrially with the plurality of radiotelephones over substantially the satellite frequency band; and
a diversity receiver that is configured to diversity combine at least two satellite frequency band signals from a radiotelephone that are received by the first ancillary terrestrial component, by a second ancillary terrestrial component and/or by an auxiliary antenna system.

99. A first ancillary terrestrial network component according to claim 98 wherein the second ancillary terrestrial component is adjacent the first ancillary terrestrial component.

100. A first ancillary terrestrial component according to claim 98 in combination with the auxiliary antenna system.

101. A first ancillary terrestrial network according to claim 99 wherein the first ancillary terrestrial component communicates with the plurality of radiotelephones over an area that defines a cell, and wherein the auxiliary antenna system is located within and/or outside the cell.

102. A first ancillary terrestrial component according to claim 98 wherein the diversity receiver that is configured to diversity combine at least two satellite frequency band signals from a radiotelephone that are received by the first ancillary terrestrial component, that are received by a second ancillary terrestrial component and/or that are received by an auxiliary antenna system comprises a space diversity and/or a polarization diversity receiver and wherein the at least two satellite frequency band signals from the radiotelephone are received by the first ancillary terrestrial component, by the second ancillary terrestrial component and/or by the auxiliary antenna system using at least two spatially separated antennas and/or at least two different antenna polarizations.

103. A method for increasing link margin in a satellite radiotelephone system that includes a space-based component that is configured to communicate with a plurality of radiotelephones over a satellite frequency band and a plurality of ancillary terrestrial components that are configured to communicate terrestrially with the plurality of radiotelephones over substantially the satellite frequency band, the method comprising:
diversity combining at least two satellite frequency band signals from a radiotelephone that are received by a first ancillary terrestrial component, that are received by a second ancillary terrestrial component and/or that are received by an auxiliary antenna system.

104. A method according to claim 103 wherein the first ancillary terrestrial component is adjacent the second ancillary terrestrial component.

105. A method according to claim 103 wherein the first ancillary terrestrial component communicates with the plurality of radiotelephones over an area that defines a cell, and wherein the auxiliary antenna system is located within and/or outside the cell.

106. A method according to claim 101 wherein diversity combining at least two satellite frequency band signals from a radiotelephone that are received by a first ancillary terrestrial component, that are received by a second ancillary terrestrial component and/or that are received by an auxiliary antenna system comprises space and/or polarization diversity combining least two satellite frequency band signals from the radiotelephone that are received by the first ancillary terrestrial component by the second ancillary terrestrial component and/or by the auxiliary antenna system using at least two spatially separated antennas and/or at least two different antenna polarizations.

107. An ancillary terrestrial network for a satellite radiotelephone system that includes a space-based component that is configured to communicate with a plurality of radiotelephones, the ancillary terrestrial network comprising:
a plurality of ancillary terrestrial components that are configured to communicate terrestrially with the plurality of radiotelephones using satellite frequency band signals; and
a diversity receiver that is configured to diversity combine at least two satellite frequency band signals from a radiotelephone that are received by a first ancillary terrestrial component, that are received by a second ancillary terrestrial component and/or that are received by an auxiliary antenna system.

108. An ancillary terrestrial network according to claim 107 wherein the second ancillary terrestrial component is adjacent the first ancillary terrestrial component.

109. An ancillary terrestrial network according to claim 107 in combination with the auxiliary antenna system.

110. An ancillary terrestrial network according to claim 108 wherein the first ancillary terrestrial component communicates with the plurality of radiotelephones over an area that defines a cell, and wherein the auxiliary antenna system is located within and/or outside the cell.

111. An ancillary terrestrial network according to claim 107 wherein the diversity receiver that is configured to diversity combine at least two satellite frequency band signals from a radiotelephone that are received by a first ancillary terrestrial component, that are received by a second ancillary terrestrial component and/or that are received by an auxiliary antenna system comprises a space diversity and/or a polarization diversity receiver and wherein the at least two satellite frequency band signals from the radiotelephone are received by the first ancillary terrestrial component, by the second ancillary terrestrial component and/or by the auxiliary antenna system using at least two spatially separated antennas and/or at least two different antenna polarizations.

112. A first ancillary terrestrial component for a satellite radiotelephone system that includes a space-based component that is configured to communicate with a plurality of radiotelephones, the first ancillary terrestrial component comprising:
a subsystem that is configured to communicate terrestrially with the plurality of radiotelephones using satellite frequency band signals; and a diversity receiver that is configured to diversity combine at least two satellite frequency band signals from a radiotelephone that are received by the first ancillary terrestrial component, by a second ancillary terrestrial component and/or by an auxiliary antenna system.

113. A first ancillary terrestrial component according to claim 112 wherein the second ancillary terrestrial component is adjacent the first ancillary terrestrial component.

114. A first ancillary terrestrial component according to claim 112 in combination with the auxiliary antenna system.

115. A first ancillary terrestrial component according to claim 113 wherein the first ancillary terrestrial component communicates with the plurality of radiotelephones over an area that defines a cell, and wherein the auxiliary antenna system is located within and/or outside the cell.

116. A first ancillary terrestrial component according to claim 112 wherein the diversity receiver that is configured to diversity combine at least two satellite frequency band signals from a radiotelephone that are received by the first ancillary terrestrial component, that are received by a second ancillary terrestrial component and/or that are received by an auxiliary antenna system comprises a space diversity and/or a polarization diversity receiver and wherein the at least two satellite frequency band signals from the radiotelephone are received by the first ancillary terrestrial component, by the second ancillary terrestrial component and/or by the auxiliary antenna system using at least two spatially separated antennas and/or at least two different antenna polarizations.

117. A method for increasing link margin in a satellite radiotelephone system that includes a space-based component that is configured to communicate with a plurality of radiotelephones and a plurality of ancillary terrestrial components that are configured to communicate terrestrially with the plurality of radiotelephones using satellite frequency band signals, the method comprising:

diversity combining at least two satellite frequency band signals from a radiotelephone that are received by a first ancillary terrestrial component, that are received by a second ancillary terrestrial component and/or that are received by an auxiliary antenna system.

118. A method according to claim 117 wherein the first ancillary terrestrial component is adjacent the second ancillary terrestrial component.

119. A method according to claim 117 wherein the first ancillary terrestrial component communicates with the plurality of radiotelephones over an area that defines a cell, and wherein the auxiliary antenna system is located within and/or outside the cell.

120. A method according to claim 117 wherein diversity combining at least two satellite frequency band signals from a radiotelephone that are received by a first ancillary terrestrial component, that are received by a second ancillary terrestrial component and/or that are received by an auxiliary antenna system comprises space and/or polarization diversity combining at least two satellite frequency band signals from the radiotelephone that are received by the first ancillary terrestrial component by the second ancillary terrestrial component and/or by the auxiliary antenna system using at least two spatially separated antennas and/or at least two different antenna polarizations.

* * * * *

UNITED STATES PATENT AND TRADEMARK OFFICE
CERTIFICATE OF CORRECTION

PATENT NO. : 7,113,778 B2
APPLICATION NO. : 10/819542
DATED : September 26, 2006
INVENTOR(S) : P. Karabinis Page 1 of 1

It is certified that error appears in the above-identified patent and that said Letters Patent is hereby corrected as shown below:

Column 34, line 61, "forte" should be --for the--.
Column 44, line 55, "apparatus" should be --method--.
Column 45, line 62, "apparatus" should be --method--.
Column 46, line 58, "apparatus" should be --method--.
Column 47, line 39, "bend" should be --band--.
Column 47, line 49, "byte" should be --by the--.
Column 50, line 17, Insert --at-- after "combining".

Signed and Sealed this

Thirtieth Day of January, 2007

JON W. DUDAS
*Director of the United States Patent and Trademark Office*